US012792207B2

(12) United States Patent
Dancie et al.

(10) Patent No.: US 12,792,207 B2
(45) **Date of Patent: *Nov. 10, 2026**

(54) EDGE GESTURE INTERFACE WITH SMART INTERACTIONS

(71) Applicant: Snap Inc., Santa Monica, CA (US)

(72) Inventors: Nicolas Dancie, Montreuil (FR); Charly Delaroche, Alfortville (FR); Alexis Druon, Paris (FR); Nicolas Fallourd, Domont (FR); Ugo Latargere, Paris (FR); Antoine Martin, Paris (FR)

(73) Assignee: Snap Inc., Santa Monica, CA (US)

(*) Notice: Subject to any disclaimer, the term of this patent is extended or adjusted under 35 U.S.C. 154(b) by 296 days.

This patent is subject to a terminal disclaimer.

(21) Appl. No.: 18/763,535

(22) Filed: Jul. 3, 2024

(65) Prior Publication Data

US 2024/0353991 A1 Oct. 24, 2024

Related U.S. Application Data

(63) Continuation of application No. 18/133,454, filed on Apr. 11, 2023, now Pat. No. 12,147,654, which is a (Continued)

(51) Int. Cl.
*G06F 3/048* (2013.01)
*G06F 3/04845* (2022.01)
(Continued)

(52) U.S. Cl.
CPC ........ *G06F 3/04845* (2013.01); *G06F 3/0488* (2013.01); *G06T 11/20* (2013.01)

(58) Field of Classification Search
CPC ............... G06F 3/04845; G06F 3/0488; G06F 2200/1614; G06F 2203/04806;
(Continued)

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | | |
|---|---|---|---|---|
| AU | 2011261689 | A1 * | 12/2012 | ........... G06F 16/444 |
| CA | 2887596 | A1 | 7/2015 | |

(Continued)

OTHER PUBLICATIONS

"U.S. Appl. No. 18/785,090, Non Final Office Action mailed Mar. 5, 2026", 18 pgs.

(Continued)

*Primary Examiner* — Rashawn N Tillery
(74) *Attorney, Agent, or Firm* — Schwegman Lundberg & Woessner, P.A.

(57) ABSTRACT

Methods, systems, user interfaces, media, and devices provide a geographically-based graphical user interface (GUI) suited to single-handed operation of a device. The method and system provide for causing display of a GUI including map data displayed in a first view; receiving input comprising at least one input point; determining first and second characteristics of the input; processing, when the first characteristic fulfils a first operational mode criterion, the input according to a first operational mode and causing display of the map data in a second view, the second view being based on the second characteristic of the input; and processing, when the first characteristic of the input fulfils a second operational mode criterion, the input according to a second operational mode, and causing display of the map data in a third view, the third view being based on the second characteristic of the input.

20 Claims, 12 Drawing Sheets

Related U.S. Application Data continuation of application No. 17/722,886, filed on Apr. 18, 2022, now Pat. No. 11,714,535, which is a continuation of application No. 16/946,946, filed on Jul. 13, 2020, now Pat. No. 11,307,747.

(60) Provisional application No. 62/873,077, filed on Jul. 11, 2019.

(51) Int. Cl.
*G06F 3/0488* (2022.01)
*G06T 11/20* (2006.01)

(58) Field of Classification Search
CPC .. G06F 1/1694; G06F 3/04815; G06F 3/0485; G06T 11/20; G01C 21/3664; G01C 21/367
See application file for complete search history.

(56) References Cited

U.S. PATENT DOCUMENTS 4,975,690 A 12/1990 Torres
5,072,412 A 12/1991 Henderson, Jr. et al.
5,493,692 A 2/1996 Theimer et al.
5,713,073 A 1/1998 Warsta
5,754,939 A 5/1998 Herz et al.
5,855,008 A 12/1998 Goldhaber et al.
5,880,731 A 3/1999 Liles et al.
5,883,639 A 3/1999 Walton et al.
5,999,932 A 12/1999 Paul
6,012,098 A 1/2000 Bayeh et al.
6,014,090 A 1/2000 Rosen et al.
6,023,270 A 2/2000 Brush, II et al.
6,029,141 A 2/2000 Bezos et al.
6,038,295 A 3/2000 Mattes
6,049,711 A 4/2000 Yehezkel et al.
6,154,764 A 11/2000 Nitta et al.
6,167,435 A 12/2000 Druckenmiller et al.
6,204,840 B1 3/2001 Petelycky et al.
6,205,432 B1 3/2001 Gabbard et al.
6,216,141 B1 4/2001 Straub et al.
6,223,165 B1 4/2001 Lauffer
6,285,381 B1 9/2001 Sawano et al.
6,285,987 B1 9/2001 Roth et al.
6,310,694 B1 10/2001 Okimoto et al.
6,317,789 B1 11/2001 Rakavy et al.
6,334,149 B1 12/2001 Davis, Jr. et al.
6,349,203 B1 2/2002 Asaoka et al.
6,353,170 B1 3/2002 Eyzaguirre et al.
6,446,004 B1 9/2002 Cao et al.
6,449,657 B2 9/2002 Stanbach et al.
6,456,852 B2 9/2002 Bar et al.
6,484,196 B1 11/2002 Maurille
6,487,601 B1 11/2002 Hubacher et al.
6,523,008 B1 2/2003 Avrunin
6,542,749 B2 4/2003 Tanaka et al.
6,549,768 B1 4/2003 Fraccaroli
6,618,593 B1 9/2003 Drutman et al.
6,622,174 B1 9/2003 Ukita et al.
6,631,463 B1 10/2003 Floyd et al.
6,636,247 B1 10/2003 Hamzy et al.
6,636,855 B2 10/2003 Holloway et al.
6,643,684 B1 11/2003 Malkin et al.
6,658,095 B1 12/2003 Yoakum et al.
6,665,531 B1 12/2003 Soderbacka et al.
6,668,173 B2 12/2003 Greene
6,684,238 B1 1/2004 Dutta
6,684,257 B1 1/2004 Camut et al.
6,698,020 B1 2/2004 Zigmond et al.
6,700,506 B1 3/2004 Winkler
6,720,860 B1 4/2004 Narayanaswami
6,724,403 B1 4/2004 Santoro et al.
6,728,605 B2 4/2004 Lash et al.
6,757,713 B1 6/2004 Ogilvie et al.
6,772,195 B1 8/2004 Hatlelid et al.
6,832,222 B1 12/2004 Zimowski
6,834,195 B2 12/2004 Brandenberg et al.
6,836,792 B1 12/2004 Chen
6,842,779 B1 1/2005 Nishizawa
6,898,626 B2 5/2005 Ohashi
6,959,324 B1 10/2005 Kubik et al.
6,970,088 B2 11/2005 Kovach
6,970,907 B1 11/2005 Ullmann et al.
6,980,909 B2 12/2005 Root et al.
6,981,040 B1 12/2005 Konig et al.
7,020,494 B2 3/2006 Spriestersbach et al.
7,027,124 B2 4/2006 Foote et al.
7,072,963 B2 7/2006 Anderson et al.
7,085,571 B2 8/2006 Kalhan et al.
7,110,744 B2 9/2006 Freeny, Jr.
7,124,164 B1 10/2006 Chemtob
7,149,893 B1 12/2006 Leonard et al.
7,173,651 B1 2/2007 Knowles
7,188,143 B2 3/2007 Szeto
7,203,380 B2 4/2007 Chiu et al.
7,206,568 B2 4/2007 Sudit
7,227,937 B1 6/2007 Yoakum et al.
7,237,002 B1 6/2007 Estrada et al.
7,240,089 B2 7/2007 Boudreau
7,269,426 B2 9/2007 Kokkonen et al.
7,280,658 B2 10/2007 Amini et al.
7,315,823 B2 1/2008 Brondrup
7,342,587 B2 3/2008 Danzig et al.
7,349,768 B2 3/2008 Bruce et al.
7,356,564 B2 4/2008 Hartselle et al.
7,394,345 B1 7/2008 Ehlinger et al.
7,411,493 B2 8/2008 Smith
7,423,580 B2 9/2008 Markhovsky et al.
7,440,842 B1 10/2008 Vorona
7,454,442 B2 11/2008 Cobleigh et al.
7,468,729 B1 12/2008 Levinson
7,508,419 B2 3/2009 Toyama et al.
7,512,649 B2 3/2009 Faybishenko et al.
7,519,670 B2 4/2009 Hagale et al.
7,535,890 B2 5/2009 Rojas
7,546,554 B2 6/2009 Chiu et al.
7,607,096 B2 10/2009 Oreizy et al.
7,636,755 B2 12/2009 Blattner et al.
7,639,251 B2 12/2009 Gu et al.
7,639,943 B1 12/2009 Kalajan
7,650,231 B2 1/2010 Gadler
7,668,537 B2 2/2010 DeVries
7,770,137 B2 8/2010 Forbes et al.
7,775,885 B2 8/2010 Van Luchene et al.
7,777,648 B2 8/2010 Smith et al.
7,778,973 B2 8/2010 Choi
7,779,444 B2 8/2010 Glad
7,787,886 B2 8/2010 Markhovsky et al.
7,796,946 B2 9/2010 Eisenbach
7,801,954 B2 9/2010 Cadiz et al.
7,856,360 B2 12/2010 Kramer et al.
7,859,551 B2 12/2010 Bulman et al.
7,885,931 B2 2/2011 Seo et al.
7,925,703 B2 4/2011 Dinan et al.
7,971,156 B2 6/2011 Albertson et al.
7,996,793 B2 8/2011 Latta et al.
8,001,204 B2 8/2011 Burtner et al.
8,032,586 B2 10/2011 Challenger et al.
8,082,255 B1 12/2011 Carlson, Jr. et al.
8,088,044 B2 1/2012 Tchao et al.
8,090,351 B2 1/2012 Klein
8,095,878 B2 1/2012 Bates et al.
8,098,904 B2 1/2012 Ioffe et al.
8,099,109 B2 1/2012 Altman et al.
8,108,774 B2 1/2012 Finn et al.
8,112,716 B2 2/2012 Kobayashi
8,117,281 B2 2/2012 Robinson et al.
8,130,219 B2 3/2012 Fleury et al.
8,131,597 B2 3/2012 Hudetz
8,135,166 B2 3/2012 Rhoads
8,136,028 B1 3/2012 Loeb et al.
8,146,001 B1 3/2012 Reese
8,146,005 B2 3/2012 Jones et al.

(56) References Cited

U.S. PATENT DOCUMENTS 8,151,191 B2 4/2012 Nicol
8,161,115 B2 4/2012 Yamamoto
8,161,417 B1 4/2012 Lee
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,276,092 B1 9/2012 Narayanan et al.
8,279,319 B2 10/2012 Date
8,280,406 B2 10/2012 Ziskind et al.
8,285,199 B2 10/2012 Hsu et al.
8,287,380 B2 10/2012 Nguyen et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,326,315 B2 12/2012 Phillips et al.
8,326,327 B2 12/2012 Hymel et al.
8,332,475 B2 12/2012 Rosen et al.
8,352,546 B1 1/2013 Dollard
8,379,130 B2 2/2013 Forutanpour et al.
8,384,719 B2 2/2013 Reville et al.
8,385,950 B1 2/2013 Wagner et al.
RE44,054 E 3/2013 Kim
8,396,708 B2 3/2013 Park et al.
8,402,097 B2 3/2013 Szeto
8,405,773 B2 3/2013 Hayashi et al.
8,418,067 B2 4/2013 Cheng et al.
8,423,409 B2 4/2013 Rao
8,425,322 B2 4/2013 Gillo et al.
8,458,601 B2 6/2013 Castelli et al.
8,462,198 B2 6/2013 Lin et al.
8,471,914 B2 6/2013 Sakiyama et al.
8,472,935 B1 6/2013 Fujisaki
8,484,158 B2 7/2013 Deluca et al.
8,487,938 B2 7/2013 Latta et al.
8,495,503 B2 7/2013 Brown et al.
8,495,505 B2 7/2013 Smith et al.
8,504,089 B2 8/2013 Stewart
8,504,926 B2 8/2013 Wolf
8,510,383 B2 8/2013 Hurley et al.
8,527,345 B2 9/2013 Rothschild et al.
8,554,627 B2 10/2013 Svendsen et al.
8,559,980 B2 10/2013 Pujol
8,560,612 B2 10/2013 Kilmer et al.
8,564,621 B2 10/2013 Branson et al.
8,564,710 B2 10/2013 Nonaka et al.
8,581,911 B2 11/2013 Becker et al.
8,589,808 B1 11/2013 Alfaro et al.
8,594,680 B2 11/2013 Ledlie et al.
8,597,121 B2 12/2013 del Valle
8,601,051 B2 12/2013 Wang
8,601,379 B2 12/2013 Marks et al.
8,605,094 B1 12/2013 Alfaro et al.
8,613,089 B1 12/2013 Holloway et al.
8,632,408 B2 1/2014 Gillo et al.
8,648,865 B2 2/2014 Dawson et al.
8,659,548 B2 2/2014 Hildreth
8,660,358 B1 2/2014 Bergboer et al.
8,660,369 B2 2/2014 Llano et al.
8,660,793 B2 2/2014 Ngo et al.
8,682,350 B2 3/2014 Altman et al.
8,683,354 B2 3/2014 Khandelwal et al.
8,692,830 B2 4/2014 Nelson et al.
8,718,333 B2 5/2014 Wolf et al.
8,724,622 B2 5/2014 Rojas
8,732,168 B2 5/2014 Johnson
8,744,523 B2 6/2014 Fan et al.
8,745,132 B2 6/2014 Obradovich
8,761,800 B2 6/2014 Kuwahara
8,768,876 B2 7/2014 Shim et al.
8,775,972 B2 7/2014 Spiegel
8,788,680 B1 7/2014 Naik
8,790,187 B2 7/2014 Walker et al.
8,797,415 B2 8/2014 Arnold
8,798,646 B1 8/2014 Wang et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,856,349 B2 10/2014 Jain et al.
8,856,691 B2 10/2014 Geisner et al.
8,874,677 B2 10/2014 Rosen et al.
8,886,227 B2 11/2014 Schmidt et al.
8,890,926 B2 11/2014 Tandon et al.
8,892,999 B2 11/2014 Nims et al.
8,909,679 B2 12/2014 Root et al.
8,909,725 B1 12/2014 Sehn
8,924,250 B2 12/2014 Bates et al.
8,963,926 B2 2/2015 Brown et al.
8,972,357 B2 3/2015 Shim et al.
8,989,786 B2 3/2015 Feghali
8,995,433 B2 3/2015 Rojas
9,014,726 B1 4/2015 Foster
9,015,285 B1 4/2015 Ebsen et al.
9,020,745 B2 4/2015 Johnston et al.
9,040,574 B2 5/2015 Wang et al.
9,055,416 B2 6/2015 Rosen et al.
9,086,776 B2 7/2015 Ye et al.
9,094,137 B1 7/2015 Sehn et al.
9,100,806 B2 8/2015 Rosen et al.
9,100,807 B2 8/2015 Rosen et al.
9,104,293 B1 8/2015 Kornfeld et al.
9,105,014 B2 8/2015 Collet et al.
9,113,301 B1 8/2015 Spiegel et al.
9,119,027 B2 8/2015 Sharon et al.
9,123,074 B2 9/2015 Jacobs et al.
9,143,382 B2 9/2015 Bhogal et al.
9,143,681 B1 9/2015 Ebsen et al.
9,152,477 B1 10/2015 Campbell et al.
9,158,414 B1 10/2015 Gluzberg et al.
9,191,776 B2 11/2015 Root et al.
9,204,252 B2 12/2015 Root
9,225,897 B1 12/2015 Sehn et al.
9,230,160 B1 1/2016 Kanter
9,241,184 B2 1/2016 Weerasinghe
9,256,860 B2 2/2016 Herger et al.
9,258,459 B2 2/2016 Hartley
9,276,886 B1 3/2016 Samaranayake
9,298,257 B2 3/2016 Hwang et al.
9,314,692 B2 4/2016 Konoplev et al.
9,330,483 B2 5/2016 Du et al.
9,344,606 B2 5/2016 Hartley et al.
9,357,174 B2 5/2016 Li et al.
9,361,510 B2 6/2016 Yao et al.
9,378,576 B2 6/2016 Bouaziz et al.
9,385,983 B1 7/2016 Sehn
9,396,354 B1 7/2016 Murphy et al.
9,402,057 B2 7/2016 Kaytaz et al.
9,407,712 B1 8/2016 Sehn
9,407,816 B1 8/2016 Sehn
9,412,192 B2 8/2016 Mandel et al.
9,430,783 B1 8/2016 Sehn
9,439,041 B2 9/2016 Parvizi et al.
9,443,227 B2 9/2016 Evans et al.
9,450,907 B2 9/2016 Pridmore et al.
9,459,778 B2 10/2016 Hogeg et al.
9,460,541 B2 10/2016 Li et al.
9,489,661 B2 11/2016 Evans et al.
9,489,760 B2 11/2016 Li et al.
9,491,134 B2 11/2016 Rosen et al.
9,503,845 B2 11/2016 Vincent
9,508,197 B2 11/2016 Quinn et al.
9,532,171 B2 12/2016 Allen et al.
9,537,811 B2 1/2017 Allen et al.
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,628,950 B1 4/2017 Noeth et al.
9,648,376 B2 5/2017 Chang et al.
9,697,635 B2 7/2017 Quinn et al.

(56) References Cited

U.S. PATENT DOCUMENTS

| | | | |
|---|---|---|---|
| 9,705,831 | B2 | 7/2017 | Spiegel |
| 9,706,040 | B2 | 7/2017 | Kadirvel et al. |
| 9,710,821 | B2 | 7/2017 | Heath |
| 9,742,713 | B2 | 8/2017 | Spiegel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,854,219 | B2 | 12/2017 | Sehn |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,102,423 | B2 | 10/2018 | Shaburov et al. |
| 10,108,693 | B2 | 10/2018 | Edecker et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,284,508 | B1 | 5/2019 | Allen et al. |
| 10,362,219 | B2 | 7/2019 | Wilson et al. |
| 10,439,972 | B1 | 10/2019 | Spiegel et al. |
| 10,475,225 | B2 | 11/2019 | Park et al. |
| 10,504,266 | B2 | 12/2019 | Blattner et al. |
| 10,509,466 | B1 | 12/2019 | Miller et al. |
| 10,514,876 | B2 | 12/2019 | Sehn |
| 10,573,048 | B2 | 2/2020 | Ni et al. |
| 10,579,869 | B1 | 3/2020 | Xiong et al. |
| 10,614,855 | B2 | 4/2020 | Huang |
| 10,635,287 | B2 | 4/2020 | Moore et al. |
| 10,657,701 | B2 | 5/2020 | Osman et al. |
| 10,674,311 | B1 | 6/2020 | Bouba et al. |
| 10,748,347 | B1 | 8/2020 | Li et al. |
| 10,893,385 | B1 | 1/2021 | Berardino et al. |
| 10,936,066 | B1 | 3/2021 | Jaureguiberry et al. |
| 10,939,246 | B1 | 3/2021 | Dancie et al. |
| 10,945,098 | B2 | 3/2021 | Dancie et al. |
| 10,946,292 | B1 * | 3/2021 | George .................. A63F 13/30 |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,032,670 | B1 | 6/2021 | Baylin et al. |
| 11,036,368 | B1 | 6/2021 | Al Majid et al. |
| 11,039,270 | B2 | 6/2021 | Bouba et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,166,123 | B1 | 11/2021 | Guillaume |
| 11,169,600 | B1 | 11/2021 | Canberk et al. |
| 11,227,626 | B1 | 1/2022 | Krishnan Gorumkonda et al. |
| 11,275,439 | B2 | 3/2022 | Jaureguiberry et al. |
| 11,294,936 | B1 | 4/2022 | Jaureguiberry |
| 11,307,747 | B2 | 4/2022 | Dancie et al. |
| 11,373,501 | B1 | 6/2022 | Houser |
| 11,526,891 | B2 | 12/2022 | Unnerstall |
| 11,531,402 | B1 | 12/2022 | Stolzenberg |
| 11,546,505 | B2 | 1/2023 | Canberk |
| 11,601,783 | B2 | 3/2023 | Berardino et al. |
| 11,638,115 | B2 | 4/2023 | Bouba et al. |
| 11,692,835 | B2 | 7/2023 | Truong et al. |
| 11,693,887 | B2 | 7/2023 | Jaureguiberry |
| 11,714,535 | B2 | 8/2023 | Dancie et al. |
| 11,751,015 | B2 | 9/2023 | Dancie et al. |
| 11,809,624 | B2 | 11/2023 | Jaureguiberry et al. |
| 11,852,554 | B1 | 12/2023 | Guillaume et al. |
| 11,868,414 | B1 | 1/2024 | Leveau et al. |
| 11,877,211 | B2 | 1/2024 | Baylin et al. |
| 11,917,495 | B2 | 2/2024 | Berardino et al. |
| 12,147,654 | B2 | 11/2024 | Dancie et al. |
| 2002/0047868 | A1 | 4/2002 | Miyazawa |
| 2002/0067362 | A1 | 6/2002 | Agostino Nocera et al. |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0122659 | A1 | 9/2002 | Mcgrath et al. |
| 2002/0128047 | A1 | 9/2002 | Gates |
| 2002/0144154 | A1 | 10/2002 | Tomkow |
| 2002/0169644 | A1 | 11/2002 | Greene |
| 2003/0001846 | A1 | 1/2003 | Davis et al. |
| 2003/0016247 | A1 | 1/2003 | Lai et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |
| 2003/0052925 | A1 | 3/2003 | Daimon et al. |
| 2003/0101230 | A1 | 5/2003 | Benschoter et al. |
| 2003/0110503 | A1 | 6/2003 | Perkes |
| 2003/0126215 | A1 | 7/2003 | Udell |
| 2003/0148773 | A1 | 8/2003 | Spriestersbach et al. |
| 2003/0164856 | A1 | 9/2003 | Prager et al. |
| 2003/0229607 | A1 | 12/2003 | Zellweger et al. |
| 2004/0027371 | A1 | 2/2004 | Jaeger |
| 2004/0064429 | A1 | 4/2004 | Hirstius et al. |
| 2004/0078367 | A1 | 4/2004 | Anderson et al. |
| 2004/0111467 | A1 | 6/2004 | Willis |
| 2004/0158739 | A1 | 8/2004 | Wakai et al. |
| 2004/0189465 | A1 | 9/2004 | Capobianco et al. |
| 2004/0203959 | A1 | 10/2004 | Coombes |
| 2004/0215625 | A1 | 10/2004 | Svendsen et al. |
| 2004/0243531 | A1 | 12/2004 | Dean |
| 2004/0243688 | A1 | 12/2004 | Wugofski |
| 2005/0021444 | A1 | 1/2005 | Bauer et al. |
| 2005/0022211 | A1 | 1/2005 | Veselov et al. |
| 2005/0048989 | A1 | 3/2005 | Jung |
| 2005/0078804 | A1 | 4/2005 | Yomoda |
| 2005/0097176 | A1 | 5/2005 | Schatz et al. |
| 2005/0102381 | A1 | 5/2005 | Jiang et al. |
| 2005/0104976 | A1 | 5/2005 | Currans |
| 2005/0114783 | A1 | 5/2005 | Szeto |
| 2005/0119936 | A1 | 6/2005 | Buchanan et al. |
| 2005/0122405 | A1 | 6/2005 | Voss et al. |
| 2005/0162419 | A1 | 7/2005 | Kim et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0206610 | A1 | 9/2005 | Cordelli |
| 2005/0223066 | A1 | 10/2005 | Buchheit et al. |
| 2005/0288954 | A1 | 12/2005 | McCarthy et al. |
| 2006/0026067 | A1 | 2/2006 | Nicholas et al. |
| 2006/0107297 | A1 | 5/2006 | Toyama et al. |
| 2006/0114338 | A1 | 6/2006 | Rothschild |
| 2006/0119882 | A1 | 6/2006 | Harris et al. |
| 2006/0142944 | A1 | 6/2006 | Orwant |
| 2006/0242239 | A1 | 10/2006 | Morishima et al. |
| 2006/0252438 | A1 | 11/2006 | Ansamaa et al. |
| 2006/0265417 | A1 | 11/2006 | Amato et al. |
| 2006/0270419 | A1 | 11/2006 | Crowley et al. |
| 2006/0287878 | A1 | 12/2006 | Wadhwa et al. |
| 2006/0294465 | A1 | 12/2006 | Ronen et al. |
| 2007/0004426 | A1 | 1/2007 | Pfleging et al. |
| 2007/0038715 | A1 | 2/2007 | Collins et al. |
| 2007/0040931 | A1 | 2/2007 | Nishizawa |
| 2007/0073517 | A1 | 3/2007 | Panje |
| 2007/0073823 | A1 | 3/2007 | Cohen et al. |
| 2007/0075898 | A1 | 4/2007 | Markhovsky et al. |
| 2007/0082707 | A1 | 4/2007 | Flynt et al. |
| 2007/0113181 | A1 | 5/2007 | Blattner et al. |
| 2007/0136228 | A1 | 6/2007 | Petersen |
| 2007/0168863 | A1 | 7/2007 | Blattner et al. |
| 2007/0176921 | A1 | 8/2007 | Iwasaki et al. |
| 2007/0192128 | A1 | 8/2007 | Celestini |

(56) References Cited

U.S. PATENT DOCUMENTS

2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0028032 A1 1/2008 Hladik
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0062141 A1 3/2008 Chandhri
2008/0070593 A1 3/2008 Altman et al.
2008/0076505 A1 3/2008 Ngyen et al.
2008/0092233 A1 4/2008 Tian et al.
2008/0094387 A1 4/2008 Chen
2008/0097980 A1 4/2008 Sullivan
2008/0104503 A1 5/2008 Beall et al.
2008/0109844 A1 5/2008 Baldeschweiler et al.
2008/0120409 A1 5/2008 Sun et al.
2008/0147730 A1 6/2008 Lee et al.
2008/0148150 A1 6/2008 Mall
2008/0158222 A1 7/2008 Li et al.
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay
2008/0248815 A1 10/2008 Busch
2008/0255976 A1 10/2008 Altberg et al.
2008/0256446 A1 10/2008 Yamamoto
2008/0256577 A1 10/2008 Funaki et al.
2008/0266421 A1 10/2008 Takahata et al.
2008/0270938 A1 10/2008 Carlson
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0318616 A1 12/2008 Chipalkatti et al.
2009/0006191 A1 1/2009 Arankalle et al.
2009/0006565 A1 1/2009 Velusamy et al.
2009/0012788 A1 1/2009 Gilbert et al.
2009/0015703 A1 1/2009 Kim et al.
2009/0016617 A1 1/2009 Bregman-Amitai et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0055484 A1 2/2009 Vuong et al.
2009/0058822 A1 3/2009 Chaudhri
2009/0070688 A1 3/2009 Gyorfi et al.
2009/0079846 A1 3/2009 Chou
2009/0089678 A1 4/2009 Sacco et al.
2009/0089710 A1 4/2009 Wood et al.
2009/0093261 A1 4/2009 Ziskind
2009/0099925 A1 4/2009 Mehta et al.
2009/0106672 A1 4/2009 Burstrom
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158170 A1 6/2009 Narayanan et al.
2009/0160970 A1 6/2009 Fredlund et al.
2009/0163182 A1 6/2009 Gatti et al.
2009/0177299 A1 7/2009 Van De Sluis
2009/0177976 A1 7/2009 Bokor et al.
2009/0192900 A1 7/2009 Collision
2009/0199242 A1 8/2009 Johnson et al.
2009/0202114 A1 8/2009 Morin et al.
2009/0215469 A1 8/2009 Fisher et al.
2009/0232354 A1 9/2009 Camp, Jr. et al.
2009/0234815 A1 9/2009 Boerries et al.
2009/0239552 A1 9/2009 Churchill et al.
2009/0249222 A1 10/2009 Schmidt et al.
2009/0249244 A1 10/2009 Robinson et al.
2009/0265604 A1 10/2009 Howard et al.
2009/0265647 A1 10/2009 Martin et al.
2009/0288022 A1 11/2009 Almstrand et al.
2009/0291672 A1 11/2009 Treves et al.
2009/0292608 A1 11/2009 Polachek
2009/0300525 A1 12/2009 Jolliff et al.
2009/0303984 A1 12/2009 Clark et al.
2009/0319172 A1 12/2009 Almeida et al.
2009/0319288 A1 12/2009 Slaney et al.
2009/0319607 A1 12/2009 Belz et al.
2009/0327073 A1 12/2009 Li
2010/0011422 A1 1/2010 Mason et al.
2010/0014443 A1 1/2010 Cristian et al.
2010/0023885 A1 1/2010 Reville et al.
2010/0062794 A1 3/2010 Han
2010/0082427 A1 4/2010 Burgener et al.
2010/0082693 A1 4/2010 Hugg et al.
2010/0085416 A1* 4/2010 Hegde .................... H04N 7/157 348/E7.083
2010/0100568 A1 4/2010 Papin et al.
2010/0113065 A1 5/2010 Narayan et al.
2010/0115426 A1 5/2010 Liu et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0159944 A1 6/2010 Pascal et al.
2010/0161658 A1 6/2010 Hamynen et al.
2010/0161831 A1 6/2010 Haas et al.
2010/0162149 A1 6/2010 Sheleheda et al.
2010/0167646 A1 7/2010 Alameh et al.
2010/0183280 A1 7/2010 Beauregard et al.
2010/0185552 A1 7/2010 Deluca et al.
2010/0185665 A1 7/2010 Horn et al.
2010/0188245 A1 7/2010 Nielsen et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0201482 A1 8/2010 Robertson et al.
2010/0201536 A1 8/2010 Robertson et al.
2010/0203968 A1 8/2010 Gill et al.
2010/0214436 A1 8/2010 Kim et al.
2010/0223128 A1 9/2010 Dukellis et al.
2010/0223343 A1 9/2010 Bosan et al.
2010/0227682 A1 9/2010 Reville et al.
2010/0250109 A1 9/2010 Johnston et al.
2010/0257196 A1 10/2010 Waters et al.
2010/0259386 A1 10/2010 Holley et al.
2010/0273509 A1 10/2010 Sweeney et al.
2010/0281045 A1 11/2010 Dean
2010/0305855 A1 12/2010 Dutton et al.
2010/0306669 A1 12/2010 Della Pasqua
2010/0311395 A1 12/2010 Zheng et al.
2011/0004071 A1 1/2011 Faiola et al.
2011/0010205 A1 1/2011 Richards
2011/0029512 A1 2/2011 Folgner et al.

(56) References Cited

U.S. PATENT DOCUMENTS

| | | | |
|---|---|---|---|
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0064388 | A1 | 3/2011 | Brown et al. |
| 2011/0066743 | A1 | 3/2011 | Hurley et al. |
| 2011/0083101 | A1 | 4/2011 | Sharon et al. |
| 2011/0093780 | A1 | 4/2011 | Dunn |
| 2011/0102630 | A1 | 5/2011 | Rukes |
| 2011/0115798 | A1 | 5/2011 | Nayar et al. |
| 2011/0119133 | A1 | 5/2011 | Igelman et al. |
| 2011/0137813 | A1 | 6/2011 | Stewart |
| 2011/0137881 | A1 | 6/2011 | Cheng et al. |
| 2011/0145564 | A1 | 6/2011 | Moshir et al. |
| 2011/0148864 | A1 | 6/2011 | Lee et al. |
| 2011/0159886 | A1 | 6/2011 | Kangas et al. |
| 2011/0159890 | A1 | 6/2011 | Fortescue et al. |
| 2011/0164163 | A1 | 7/2011 | Bilbrey et al. |
| 2011/0166777 | A1 | 7/2011 | Chavakula |
| 2011/0197194 | A1 | 8/2011 | D'Angelo et al. |
| 2011/0199917 | A1 | 8/2011 | Karaoguz et al. |
| 2011/0202598 | A1 | 8/2011 | Evans et al. |
| 2011/0202968 | A1 | 8/2011 | Nurmi |
| 2011/0208425 | A1 | 8/2011 | Zheng et al. |
| 2011/0211534 | A1 | 9/2011 | Schmidt et al. |
| 2011/0213845 | A1 | 9/2011 | Logan et al. |
| 2011/0215966 | A1 | 9/2011 | Kim et al. |
| 2011/0225048 | A1 | 9/2011 | Nair |
| 2011/0238289 | A1 | 9/2011 | Lehmann et al. |
| 2011/0238763 | A1 | 9/2011 | Shin et al. |
| 2011/0239136 | A1 | 9/2011 | Goldman et al. |
| 2011/0255736 | A1 | 10/2011 | Thompson et al. |
| 2011/0273575 | A1 | 11/2011 | Lee |
| 2011/0282799 | A1 | 11/2011 | Huston |
| 2011/0283188 | A1 | 11/2011 | Farrenkopf |
| 2011/0301934 | A1 | 12/2011 | Tardif |
| 2011/0314419 | A1 | 12/2011 | Dunn et al. |
| 2011/0320373 | A1 | 12/2011 | Lee et al. |
| 2012/0021759 | A1 | 1/2012 | Chen et al. |
| 2012/0028659 | A1 | 2/2012 | Whitney et al. |
| 2012/0033718 | A1 | 2/2012 | Kauffman et al. |
| 2012/0036015 | A1 | 2/2012 | Sheikh |
| 2012/0036443 | A1 | 2/2012 | Ohmori et al. |
| 2012/0054797 | A1 | 3/2012 | Skog et al. |
| 2012/0059722 | A1 | 3/2012 | Rao |
| 2012/0062805 | A1 | 3/2012 | Candelore |
| 2012/0084731 | A1 | 4/2012 | Filman et al. |
| 2012/0084835 | A1 | 4/2012 | Thomas et al. |
| 2012/0092171 | A1 | 4/2012 | Hwang et al. |
| 2012/0099800 | A1 | 4/2012 | Llano et al. |
| 2012/0108293 | A1 | 5/2012 | Law et al. |
| 2012/0110096 | A1 | 5/2012 | Smarr et al. |
| 2012/0113106 | A1 | 5/2012 | Choi et al. |
| 2012/0113143 | A1 | 5/2012 | Adhikari et al. |
| 2012/0113272 | A1 | 5/2012 | Hata |
| 2012/0123830 | A1 | 5/2012 | Svendsen et al. |
| 2012/0123871 | A1 | 5/2012 | Svendsen et al. |
| 2012/0123875 | A1 | 5/2012 | Svendsen et al. |
| 2012/0124126 | A1 | 5/2012 | Alcazar et al. |
| 2012/0124176 | A1 | 5/2012 | Curtis et al. |
| 2012/0124458 | A1 | 5/2012 | Cruzada |
| 2012/0130717 | A1 | 5/2012 | Xu et al. |
| 2012/0131507 | A1 | 5/2012 | Sparandara et al. |
| 2012/0131512 | A1 | 5/2012 | Takeuchi et al. |
| 2012/0143760 | A1 | 6/2012 | Abulafia et al. |
| 2012/0143882 | A1 | 6/2012 | Zheng et al. |
| 2012/0143963 | A1 | 6/2012 | Kennberg et al. |
| 2012/0150978 | A1 | 6/2012 | Monaco |
| 2012/0158289 | A1 | 6/2012 | Bernheim Brush et al. |
| 2012/0158622 | A1 | 6/2012 | Mital et al. |
| 2012/0165100 | A1 | 6/2012 | Lalancette et al. |
| 2012/0166971 | A1 | 6/2012 | Sachson et al. |
| 2012/0169855 | A1 | 7/2012 | Oh |
| 2012/0172062 | A1 | 7/2012 | Altman et al. |
| 2012/0173991 | A1 | 7/2012 | Roberts et al. |
| 2012/0176401 | A1 | 7/2012 | Hayward et al. |
| 2012/0184248 | A1 | 7/2012 | Speede |
| 2012/0186004 | A1 | 7/2012 | Mechling et al. |
| 2012/0197724 | A1 | 8/2012 | Kendall |
| 2012/0200743 | A1 | 8/2012 | Blanchflower et al. |
| 2012/0209924 | A1 | 8/2012 | Evans et al. |
| 2012/0210244 | A1 | 8/2012 | De Francisco Lopez et al. |
| 2012/0212632 | A1 | 8/2012 | Mate et al. |
| 2012/0220264 | A1 | 8/2012 | Kawabata |
| 2012/0226554 | A1 | 9/2012 | Schmidt et al. |
| 2012/0226748 | A1 | 9/2012 | Bosworth et al. |
| 2012/0233000 | A1 | 9/2012 | Fisher et al. |
| 2012/0236162 | A1 | 9/2012 | Imamura |
| 2012/0239584 | A1 | 9/2012 | Yariv et al. |
| 2012/0239761 | A1 | 9/2012 | Linner et al. |
| 2012/0250951 | A1 | 10/2012 | Chen |
| 2012/0252418 | A1 | 10/2012 | Kandekar et al. |
| 2012/0254325 | A1 | 10/2012 | Majeti et al. |
| 2012/0278387 | A1 | 11/2012 | Garcia et al. |
| 2012/0278692 | A1 | 11/2012 | Shi |
| 2012/0290637 | A1 | 11/2012 | Perantatos et al. |
| 2012/0299954 | A1 | 11/2012 | Wada et al. |
| 2012/0304052 | A1 | 11/2012 | Tanaka et al. |
| 2012/0304080 | A1 | 11/2012 | Wormald et al. |
| 2012/0307096 | A1 | 12/2012 | Ford et al. |
| 2012/0307112 | A1 | 12/2012 | Kunishige et al. |
| 2012/0319904 | A1 | 12/2012 | Lee et al. |
| 2012/0323933 | A1 | 12/2012 | He et al. |
| 2012/0324018 | A1 | 12/2012 | Metcalf et al. |
| 2013/0006759 | A1 | 1/2013 | Srivastava et al. |
| 2013/0018881 | A1 | 1/2013 | Bhatt |
| 2013/0024757 | A1 | 1/2013 | Doll et al. |
| 2013/0036364 | A1 | 2/2013 | Johnson |
| 2013/0045753 | A1 | 2/2013 | Obermeyer et al. |
| 2013/0050260 | A1 | 2/2013 | Reitan |
| 2013/0055083 | A1 | 2/2013 | Fino |
| 2013/0057587 | A1 | 3/2013 | Leonard et al. |
| 2013/0059607 | A1 | 3/2013 | Herz et al. |
| 2013/0060690 | A1 | 3/2013 | Oskolkov et al. |
| 2013/0063369 | A1 | 3/2013 | Malhotra et al. |
| 2013/0065517 | A1 | 3/2013 | Svensson et al. |
| 2013/0067027 | A1 | 3/2013 | Song et al. |
| 2013/0071093 | A1 | 3/2013 | Hanks et al. |
| 2013/0080254 | A1 | 3/2013 | Thramann |
| 2013/0085790 | A1 | 4/2013 | Palmer et al. |
| 2013/0086072 | A1 | 4/2013 | Peng et al. |
| 2013/0090171 | A1 | 4/2013 | Holton et al. |
| 2013/0095857 | A1 | 4/2013 | Garcia et al. |
| 2013/0103760 | A1 | 4/2013 | Golding et al. |
| 2013/0104053 | A1 | 4/2013 | Thornton et al. |
| 2013/0110885 | A1 | 5/2013 | Brundrett, III |
| 2013/0111514 | A1 | 5/2013 | Slavin et al. |
| 2013/0128059 | A1 | 5/2013 | Kristensson |
| 2013/0129252 | A1 | 5/2013 | Lauper |
| 2013/0132477 | A1 | 5/2013 | Bosworth et al. |
| 2013/0145286 | A1 | 6/2013 | Feng et al. |
| 2013/0159110 | A1 | 6/2013 | Rajaram et al. |
| 2013/0159919 | A1 | 6/2013 | Leydon |
| 2013/0169822 | A1 | 7/2013 | Zhu et al. |
| 2013/0173729 | A1 | 7/2013 | Starenky et al. |
| 2013/0182133 | A1 | 7/2013 | Tanabe |
| 2013/0185131 | A1 | 7/2013 | Sinha et al. |
| 2013/0191198 | A1 | 7/2013 | Carlson et al. |
| 2013/0194301 | A1 | 8/2013 | Robbins et al. |
| 2013/0198176 | A1 | 8/2013 | Kim |
| 2013/0201187 | A1 | 8/2013 | Tong et al. |
| 2013/0218965 | A1 | 8/2013 | Abrol et al. |
| 2013/0218968 | A1 | 8/2013 | Mcevilly et al. |
| 2013/0222323 | A1 | 8/2013 | Mckenzie |
| 2013/0227476 | A1 | 8/2013 | Frey |
| 2013/0232194 | A1 | 9/2013 | Knapp et al. |
| 2013/0249948 | A1 | 9/2013 | Reitan |
| 2013/0257877 | A1 | 10/2013 | Davis |
| 2013/0263031 | A1 | 10/2013 | Oshiro et al. |
| 2013/0265450 | A1 | 10/2013 | Barnes, Jr. |
| 2013/0267253 | A1 | 10/2013 | Case et al. |
| 2013/0275505 | A1 | 10/2013 | Gauglitz et al. |
| 2013/0290443 | A1 | 10/2013 | Collins et al. |
| 2013/0304646 | A1 | 11/2013 | De Geer |

(56) References Cited

U.S. PATENT DOCUMENTS

2013/0311255 A1 11/2013 Cummins et al.
2013/0321257 A1 12/2013 Moore et al.
2013/0321340 A1* 12/2013 Seo ...................... H04M 1/724 345/174
2013/0325321 A1 12/2013 Pylappan
2013/0325964 A1 12/2013 Berberat
2013/0332890 A1 12/2013 Ramic et al.
2013/0337830 A1 12/2013 Haro et al.
2013/0344896 A1 12/2013 Kirmse et al.
2013/0345961 A1 12/2013 Leader et al.
2013/0346869 A1 12/2013 Asver et al.
2013/0346877 A1 12/2013 Borovoy et al.
2014/0006129 A1 1/2014 Heath
2014/0011538 A1 1/2014 Mulcahy et al.
2014/0012918 A1 1/2014 Chin et al.
2014/0019264 A1 1/2014 Wachman et al.
2014/0024354 A1 1/2014 Haik et al.
2014/0032682 A1 1/2014 Prado et al.
2014/0040371 A1 2/2014 Gurevich et al.
2014/0043204 A1 2/2014 Basnayake et al.
2014/0043329 A1 2/2014 Wang et al.
2014/0045530 A1 2/2014 Gordon et al.
2014/0047016 A1 2/2014 Rao
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0055554 A1 2/2014 Du et al.
2014/0057232 A1 2/2014 Wetmore et al.
2014/0057660 A1 2/2014 Wager
2014/0066105 A1 3/2014 Bridge et al.
2014/0082651 A1 3/2014 Sharifi
2014/0092130 A1 4/2014 Anderson et al.
2014/0096029 A1 4/2014 Schultz
2014/0111451 A1 4/2014 Park et al.
2014/0114565 A1 4/2014 Aziz et al.
2014/0120906 A1 5/2014 Luo et al.
2014/0122658 A1 5/2014 Haeger et al.
2014/0122787 A1 5/2014 Shalvi et al.
2014/0125678 A1 5/2014 Wang et al.
2014/0129343 A1 5/2014 Finster et al.
2014/0129953 A1 5/2014 Spiegel
2014/0143143 A1 5/2014 Fasoli et al.
2014/0149519 A1 5/2014 Redfern et al.
2014/0155102 A1 6/2014 Cooper et al.
2014/0171036 A1 6/2014 Simmons
2014/0173424 A1 6/2014 Hogeg et al.
2014/0173457 A1 6/2014 Wang et al.
2014/0181193 A1 6/2014 Narasimhan et al.
2014/0189592 A1 7/2014 Benchenaa et al.
2014/0207679 A1 7/2014 Cho
2014/0214471 A1 7/2014 Schreiner, III
2014/0222564 A1 8/2014 Kranendonk et al.
2014/0258405 A1 9/2014 Perkin
2014/0265359 A1 9/2014 Cheng et al.
2014/0266703 A1 9/2014 Dalley, Jr. et al.
2014/0274136 A1 9/2014 Edge et al.
2014/0278220 A1 9/2014 Yuen
2014/0279061 A1 9/2014 Elimeliah et al.
2014/0279436 A1 9/2014 Dorsey et al.
2014/0279540 A1 9/2014 Jackson
2014/0280537 A1 9/2014 Pridmore et al.
2014/0282068 A1 9/2014 Levkovitz et al.
2014/0282096 A1 9/2014 Rubinstein et al.
2014/0287773 A1 9/2014 Agerstam et al.
2014/0287779 A1 9/2014 O'keefe et al.
2014/0289833 A1 9/2014 Briceno
2014/0306986 A1 10/2014 Gottesman et al.
2014/0317302 A1 10/2014 Naik
2014/0324351 A1 10/2014 Dannevik et al.
2014/0324627 A1 10/2014 Haver et al.
2014/0324629 A1 10/2014 Jacobs
2014/0325383 A1 10/2014 Brown et al.
2014/0329548 A1 11/2014 Tharshanan et al.
2014/0350716 A1 11/2014 Fly et al.
2015/0006279 A1 1/2015 Khann et al.
2015/0020086 A1 1/2015 Chen et al.
2015/0040073 A1 2/2015 Barcay et al.
2015/0046278 A1 2/2015 Pei et al.
2015/0071619 A1 3/2015 Brough
2015/0080018 A1 3/2015 Kim et al.
2015/0081725 A1 3/2015 Ogawa et al.
2015/0087263 A1 3/2015 Branscomb et al.
2015/0088622 A1 3/2015 Ganschow et al.
2015/0095020 A1 4/2015 Leydon
2015/0096042 A1 4/2015 Mizrachi
2015/0116529 A1 4/2015 Wu et al.
2015/0120293 A1 4/2015 Wohlert et al.
2015/0169827 A1 6/2015 Laborde
2015/0172534 A1 6/2015 Miyakawa et al.
2015/0178260 A1 6/2015 Brunson
2015/0185030 A1 7/2015 Monroe et al.
2015/0185991 A1 7/2015 Ho et al.
2015/0186004 A1 7/2015 Gordon
2015/0206349 A1 7/2015 Rosenthal et al.
2015/0222814 A1 8/2015 Li et al.
2015/0238137 A1 8/2015 Eyal et al.
2015/0261917 A1 9/2015 Smith
2015/0288800 A1 10/2015 Pianese et al.
2015/0301579 A1 10/2015 Vaccari et al.
2015/0312184 A1 10/2015 Langholz et al.
2015/0318874 A1 11/2015 Donaldson
2015/0350136 A1 12/2015 Flynn, III et al.
2015/0365795 A1 12/2015 Allen et al.
2015/0370320 A1 12/2015 Connor
2015/0370798 A1 12/2015 Ju et al.
2015/0378502 A1 12/2015 Hu et al.
2016/0006927 A1 1/2016 Sehn
2016/0014063 A1 1/2016 Hogeg et al.
2016/0018969 A1 1/2016 Sundarraman et al.
2016/0055250 A1 2/2016 Rush
2016/0057565 A1 2/2016 Gold
2016/0058429 A1 3/2016 Shinar et al.
2016/0085773 A1 3/2016 Chang et al.
2016/0085863 A1 3/2016 Allen et al.
2016/0094954 A1 3/2016 Millman et al.
2016/0097871 A1 4/2016 Almarhoon et al.
2016/0099901 A1 4/2016 Allen et al.
2016/0100282 A1 4/2016 Pounds et al.
2016/0134840 A1 5/2016 Mcculloch
2016/0151603 A1 6/2016 Shouldice et al.
2016/0174893 A1 6/2016 Lam
2016/0180887 A1 6/2016 Sehn
2016/0182422 A1 6/2016 Sehn et al.
2016/0182875 A1 6/2016 Sehn
2016/0192315 A1 6/2016 Paek
2016/0234149 A1 8/2016 Tsuda et al.
2016/0234151 A1 8/2016 Son
2016/0239248 A1 8/2016 Sehn
2016/0258749 A1 9/2016 Macgougan et al.
2016/0270718 A1 9/2016 Heneghan et al.
2016/0277419 A1 9/2016 Allen et al.
2016/0321708 A1 11/2016 Sehn
2016/0328661 A1 11/2016 Reese et al.
2016/0344712 A1 11/2016 Ding et al.
2016/0358214 A1 12/2016 Shalunov et al.
2016/0378286 A1 12/2016 Ke
2017/0006094 A1 1/2017 Abou Mahmoud et al.
2017/0011037 A1 1/2017 Qian et al.
2017/0032114 A1 2/2017 Turgeman
2017/0052655 A1 2/2017 Cervelli et al.
2017/0061308 A1 3/2017 Chen et al.
2017/0076198 A1 3/2017 Jin et al.
2017/0080346 A1 3/2017 Abbas
2017/0087473 A1 3/2017 Siegel et al.
2017/0113140 A1 4/2017 Blackstock et al.
2017/0118145 A1 4/2017 Aittoniemi et al.
2017/0123487 A1 5/2017 Hazra et al.
2017/0199855 A1 7/2017 Fishbeck
2017/0208564 A1 7/2017 Lee et al.
2017/0235848 A1 8/2017 Van Deusen et al.
2017/0254660 A1 9/2017 Panahandeh et al.
2017/0277684 A1 9/2017 Dharmarajan Mary

(56) References Cited

U.S. PATENT DOCUMENTS

| | | | |
|---|---|---|---|
| 2017/0277685 | A1 | 9/2017 | Takumi |
| 2017/0287006 | A1 | 10/2017 | Azmoodeh et al. |
| 2017/0310934 | A1 | 10/2017 | Du et al. |
| 2017/0312634 | A1 | 11/2017 | Ledoux et al. |
| 2017/0351910 | A1 | 12/2017 | Elwazer et al. |
| 2018/0020329 | A1 | 1/2018 | Smith |
| 2018/0047200 | A1 | 2/2018 | O'hara et al. |
| 2018/0054509 | A1 | 2/2018 | Nuescheler et al. |
| 2018/0113587 | A1 | 4/2018 | Allen et al. |
| 2018/0115503 | A1 | 4/2018 | Baldwin et al. |
| 2018/0150464 | A1 | 5/2018 | Ma et al. |
| 2018/0158370 | A1 | 6/2018 | Pryor |
| 2018/0245942 | A1 | 8/2018 | Scarr et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2018/0316571 | A1 | 11/2018 | Andrade et al. |
| 2018/0317800 | A1 | 11/2018 | Coleman et al. |
| 2018/0359112 | A1 | 12/2018 | Lee et al. |
| 2018/0365384 | A1 | 12/2018 | Althoff et al. |
| 2019/0001223 | A1 | 1/2019 | Blackstock et al. |
| 2019/0057616 | A1 | 2/2019 | Cohen et al. |
| 2019/0069839 | A1 | 3/2019 | Park et al. |
| 2019/0120629 | A1 | 4/2019 | Gum |
| 2019/0186937 | A1 | 6/2019 | Sharifi et al. |
| 2019/0188749 | A1 | 6/2019 | Peng et al. |
| 2019/0188920 | A1 | 6/2019 | Mcphee et al. |
| 2019/0251858 | A1 | 8/2019 | Baharav et al. |
| 2019/0268294 | A1 | 8/2019 | Gao |
| 2019/0320972 | A1 | 10/2019 | Tribble et al. |
| 2019/0350066 | A1 | 11/2019 | Herf et al. |
| 2020/0065694 | A1 | 2/2020 | Mohapatra et al. |
| 2020/0117340 | A1 | 4/2020 | Amitay et al. |
| 2020/0120170 | A1 | 4/2020 | Amitay et al. |
| 2020/0314586 | A1 | 10/2020 | Bouba et al. |
| 2020/0338304 | A1 | 10/2020 | Viveiros |
| 2020/0382912 | A1 | 12/2020 | Dancie et al. |
| 2020/0401225 | A1 | 12/2020 | Jaureguiberry et al. |
| 2021/0011612 | A1 | 1/2021 | Dancie et al. |
| 2021/0074016 | A1 | 3/2021 | Li et al. |
| 2021/0152979 | A1 | 5/2021 | Berardino et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0266704 | A1 | 8/2021 | Dancie et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0377693 | A1 | 12/2021 | Bouba et al. |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2021/0409904 | A1 | 12/2021 | Baylin et al. |
| 2022/0174455 | A1 | 6/2022 | Guillaume |
| 2022/0179665 | A1 | 6/2022 | Rathod |
| 2022/0188539 | A1 | 6/2022 | Chan et al. |
| 2022/0206588 | A1 | 6/2022 | Canberk et al. |
| 2022/0269345 | A1 | 8/2022 | Jaureguiberry et al. |
| 2022/0300730 | A1 | 9/2022 | Eirinberg et al. |
| 2022/0300731 | A1 | 9/2022 | Eirinberg et al. |
| 2022/0301175 | A1 | 9/2022 | Cowburn et al. |
| 2022/0326781 | A1 | 10/2022 | Hwang et al. |
| 2022/0334649 | A1 | 10/2022 | Hwang et al. |
| 2022/0335069 | A1 | 10/2022 | Jaureguiberry |
| 2022/0350472 | A1 | 11/2022 | Dancie et al. |
| 2023/0188943 | A1 | 6/2023 | Berardino et al. |
| 2023/0244370 | A1 | 8/2023 | Dancie et al. |
| 2023/0297600 | A1 | 9/2023 | Jaureguiberry |
| 2023/0341285 | A1 | 10/2023 | Guillaume et al. |
| 2023/0345209 | A1 | 10/2023 | Dancie et al. |
| 2023/0385347 | A1 | 11/2023 | Leveau et al. |
| 2024/0089703 | A1 | 3/2024 | Baylin et al. |
| 2026/0030803 | A1 | 1/2026 | Boyd et al. |

FOREIGN PATENT DOCUMENTS

| | | | | |
|---|---|---|---|---|
| CN | 103049761 | B | 8/2016 | |
| CN | 109863532 | A | 6/2019 | |
| CN | 110168478 | A | 8/2019 | |
| EP | 2051480 | A1 | 4/2009 | |
| EP | 2151797 | A1 | 2/2010 | |
| EP | 2184092 | A2 | 5/2010 | |
| EP | 3707693 | A1 | 9/2020 | |
| GB | 2399928 | A | 9/2004 | |
| JP | 2001230801 | A | 8/2001 | |
| JP | 5497931 | B2 | 3/2014 | |
| KR | 19990073076 | A | 10/1999 | |
| KR | 20010078417 | A | 8/2001 | |
| KR | 101445263 | B1 | 9/2014 | |
| KR | 20220158824 | A | 12/2022 | |
| WO | WO-1996024213 | A1 | 8/1996 | |
| WO | WO-1999063453 | A1 | 12/1999 | |
| WO | WO-2000058882 | A1 | 10/2000 | |
| WO | WO-2001029642 | A1 | 4/2001 | |
| WO | WO-2001050703 | A3 | 7/2001 | |
| WO | WO-2003094072 | A1 | 11/2003 | |
| WO | WO-2004095308 | A1 | 11/2004 | |
| WO | WO-2006107182 | A1 | 10/2006 | |
| WO | WO-2006118755 | A2 | 11/2006 | |
| WO | WO-2007092668 | A2 | 8/2007 | |
| WO | WO-2007134402 | A1 | 11/2007 | |
| WO | WO-2009043020 | A2 | 4/2009 | |
| WO | 2010023568 | | 3/2010 | |
| WO | WO-2011040821 | A1 | 4/2011 | |
| WO | WO-2011119407 | A1 | 9/2011 | |
| WO | WO-2012139276 | A1 | 10/2012 | |
| WO | WO-2013008238 | A1 | 1/2013 | |
| WO | WO-2013027893 | A1 | 2/2013 | |
| WO | WO-2013045753 | A1 | 4/2013 | |
| WO | WO-2013152454 | A1 | 10/2013 | |
| WO | WO-2013166588 | A1 | 11/2013 | |
| WO | WO-2013192586 | A2 | 12/2013 | |
| WO | WO-2014006129 | A1 | 1/2014 | |
| WO | WO-2014031899 | A1 | 2/2014 | |
| WO | WO-2014068573 | A1 | 5/2014 | |
| WO | WO-2014115136 | A1 | 7/2014 | |
| WO | WO-2014194262 | A2 | 12/2014 | |
| WO | WO-2014194439 | A1 | 12/2014 | |
| WO | WO-2015023419 | A1 * | 2/2015 | ........... G06F 1/1694 |
| WO | WO-2015192026 | A1 | 12/2015 | |
| WO | WO-2016044424 | A1 | 3/2016 | |
| WO | WO-2016054562 | A1 | 4/2016 | |
| WO | WO-2016065131 | A1 | 4/2016 | |
| WO | WO-2016090605 | A1 | 6/2016 | |
| WO | WO-2016100318 | A2 | 6/2016 | |
| WO | WO-2016100318 | A3 | 6/2016 | |
| WO | WO-2016100342 | A1 | 6/2016 | |
| WO | WO-2016149594 | A1 | 9/2016 | |
| WO | WO-2016168591 | A1 | 10/2016 | |
| WO | WO-2016179166 | A1 | 11/2016 | |
| WO | WO-2018081013 | A1 | 5/2018 | |
| WO | WO-2018102562 | A1 | 6/2018 | |
| WO | WO-2018129531 | A1 | 7/2018 | |
| WO | WO-2019089613 | A1 | 5/2019 | |
| WO | WO-2019094618 | A1 | 5/2019 | |
| WO | WO-2022005687 | A1 | 1/2022 | |
| WO | WO-2022005693 | A1 | 1/2022 | |
| WO | WO-2022060549 | A2 | 3/2022 | |
| WO | WO-2022066578 | A1 | 3/2022 | |
| WO | WO-2022132381 | A1 | 6/2022 | |
| WO | WO-2022146678 | A1 | 7/2022 | |
| WO | WO-2022198182 | A1 | 9/2022 | |
| WO | WO-2022216784 | A1 | 10/2022 | |
| WO | WO-2022225761 | A1 | 10/2022 | |
| WO | WO-2022245765 | A1 | 11/2022 | |

OTHER PUBLICATIONS

"U.S. Appl. No. 18/785,090, Examiner Interview Summary mailed May 26, 2026", 2 pgs.

"U.S. Appl. No. 18/785,090, Response filed May 29, 2026 to Non Final Office Action mailed Mar. 5, 2026", 12 pgs.

(56) References Cited

OTHER PUBLICATIONS

Burigat, S., et al., "Geographic Data Visualization on Mobile Devices for User's Navigation and Decision Support Activities", In Spatial Data on the Web: Modeling and Management, (2007), 25 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 16/946,946, Non Final Office Action mailed Mar. 23, 2021", 14 pgs.
"U.S. Appl. No. 16/946,946, Notice of Allowance mailed Dec. 9, 2021", 8 pgs.
"U.S. Appl. No. 16/946,946, Response filed Jun. 4, 2021 to Non Final Office Action mailed Mar. 23, 2021", 8 pgs.
"U.S. Appl. No. 17/722,886, Examiner Interview Summary mailed Dec. 9, 2022", 2 pgs.
"U.S. Appl. No. 17/722,886, Non Final Office Action mailed Oct. 4, 2022", 13 pgs.
"U.S. Appl. No. 17/722,886, Notice of Allowance mailed Jan. 12, 2023", 9 pgs.
"U.S. Appl. No. 17/722,886, Notice of Allowance mailed Mar. 13, 2023", 9 pgs.
"U.S. Appl. No. 17/722,886, Preliminary Amendment filed Sep. 20, 2022", 7 pgs.
"U.S. Appl. No. 17/722,886, Response filed Dec. 6, 2022 to Non Final Office Action mailed Oct. 4, 2022", 13 pgs.
"U.S. Appl. No. 18/133,454, Non Final Office Action mailed Dec. 5, 2023", 7 pgs.
"U.S. Appl. No. 18/133,454, Notice of Allowance mailed Apr. 3, 2024", 9 pgs.
"U.S. Appl. No. 18/133,454, Notice of Allowance mailed Jun. 26, 2024", 9 pgs.
"U.S. Appl. No. 18/133,454, Response filed Feb. 7, 2024 to Non Final Office Action mailed Dec. 5, 2023", 8 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"U.S. Appl. No. 16/274,891, Corrected Notice of Allowability mailed May 18, 2020", 6 pgs.
"U.S. Appl. No. 16/274,891, Notice of Allowance mailed Mar. 23, 2020", 7 pgs.
"U.S. Appl. No. 16/274,891, Notice of Allowance mailed Oct. 23, 2020", 8 pgs.
"U.S. Appl. No. 16/280,905, Advisory Action mailed Feb. 8, 2024", 2 pgs.
"U.S. Appl. No. 16/280,905, Examiner Interview Summary mailed Feb. 1, 2024", 2 pgs.
"U.S. Appl. No. 16/280,905, Examiner Interview Summary mailed Feb. 11, 2021", 3 pgs.
"U.S. Appl. No. 16/280,905, Final Office Action mailed Jan. 4, 2023", 25 pgs.
"U.S. Appl. No. 16/280,905, Final Office Action mailed Mar. 3, 2021", 22 pgs.
"U.S. Appl. No. 16/280,905, Final Office Action mailed Nov. 15, 2023", 22 pgs.
"U.S. Appl. No. 16/280,905, Final Office Action mailed Nov. 24, 2021", 21 pgs.
"U.S. Appl. No. 16/280,905, Non Final Office Action mailed May 24, 2023", 24 pgs.
"U.S. Appl. No. 16/280,905, Non Final Office Action mailed Jun. 20, 2022", 23 pgs.
"U.S. Appl. No. 16/280,905, Non Final Office Action mailed Jun. 21, 2021", 21 pgs.
"U.S. Appl. No. 16/280,905, Non Final Office Action mailed Nov. 24, 2020", 16 pgs.
"U.S. Appl. No. 16/280,905, Response filed Jan. 18, 2024 to Final Office Action mailed Nov. 15, 2023", 13 pgs.
"U.S. Appl. No. 16/280,905, Response filed Feb. 15, 2021 to Non Final Office Action mailed Nov. 24, 2020", 11 pgs.
"U.S. Appl. No. 16/280,905, Response filed Feb. 24, 2022 to Non Final Office Action mailed Nov. 24, 2020".
"U.S. Appl. No. 16/280,905, Response filed Apr. 4, 2023 to Final Office Action mailed Jan. 4, 2023", 12 pgs.

(56) References Cited

OTHER PUBLICATIONS

"U.S. Appl. No. 16/280,905, Response filed Jun. 3, 2021 to Final Office Action mailed Mar. 3, 2021", 11 pgs.
"U.S. Appl. No. 16/280,905, Response filed Aug. 18, 2023 to Non Final Office Action mailed May 24, 2023", 13 pgs.
"U.S. Appl. No. 16/280,905, Response filed Sep. 20, 2022 to Non Final Office Action mailed Jun. 20, 2022", 13 pgs.
"U.S. Appl. No. 16/280,905, Response filed Sep. 21, 2021 to Non Final Office Action mailed Jun. 21, 2021", 11 pgs.
"U.S. Appl. No. 16/351,436, Examiner Interview Summary mailed Feb. 9, 2023", 2 pgs.
"U.S. Appl. No. 16/351,436, Examiner Interview Summary mailed Feb. 14, 2024", 2 pgs.
"U.S. Appl. No. 16/351,436, Examiner Interview Summary mailed Aug. 26, 2024", 2 pgs.
"U.S. Appl. No. 16/351,436, Examiner Interview Summary mailed Oct. 12, 2023", 3 pgs.
"U.S. Appl. No. 16/351,436, Final Office Action mailed Aug. 12, 2024", 18 pgs.
"U.S. Appl. No. 16/351,436, Final Office Action mailed Nov. 1, 2022", 28 pgs.
"U.S. Appl. No. 16/351,436, Final Office Action mailed Nov. 15, 2023", 11 pgs.
"U.S. Appl. No. 16/351,436, Non Final Office Action mailed Mar. 6, 2024", 16 pgs.
"U.S. Appl. No. 16/351,436, Non Final Office Action mailed May 2, 2022", 29 pgs.
"U.S. Appl. No. 16/351,436, Non Final Office Action mailed May 24, 2023", 28 pgs.
"U.S. Appl. No. 16/351,436, Notice of Allowance mailed Oct. 24, 2024", 5 pgs.
"U.S. Appl. No. 16/351,436, Response filed Feb. 14, 2024 to Final Office Action mailed Nov. 15, 2023", 12 pgs.
"U.S. Appl. No. 16/351,436, Response filed Mar. 1, 2023 to Final Office Action mailed Nov. 1, 2022", 22 pgs.
"U.S. Appl. No. 16/351,436, Response filed Jun. 6, 2024 to Non Final Office Action mailed Mar. 6, 2024", 14 pgs.
"U.S. Appl. No. 16/351,436, Response filed Aug. 2, 2022 to Non Final Office Action mailed May 2, 2022", 14 pgs.
"U.S. Appl. No. 16/351,436, Response filed Oct. 7, 2024 to Final Office Action mailed Aug. 12, 2024", 12 pgs.
"U.S. Appl. No. 16/351,436, Response filed Oct. 24, 2023 to Non Final Office Action mailed May 24, 2023", 18 pgs.
"U.S. Appl. No. 16/353,604, Examiner Interview Summary mailed Mar. 28, 2023", 2 pgs.
"U.S. Appl. No. 16/353,604, Final Office Action mailed Feb. 8, 2022", 19 pgs.
"U.S. Appl. No. 16/353,604, Final Office Action mailed Dec. 27, 2022", 21 pgs.
"U.S. Appl. No. 16/353,604, Non Final Office Action mailed May 27, 2022", 21 pgs.
"U.S. Appl. No. 16/353,604, Non Final Office Action mailed Jul. 28, 2021", 19 pgs.
"U.S. Appl. No. 16/353,604, Notice of Allowance mailed Apr. 17, 2023", 8 pgs.
"U.S. Appl. No. 16/353,604, Response filed Mar. 27, 2023 to Final Office Action mailed Dec. 27, 2022", 12 pgs.
"U.S. Appl. No. 16/353,604, Response filed May 9, 2022 to Final Office Action mailed Feb. 8, 2022", 11 pgs.
"U.S. Appl. No. 16/353,604, Response filed Sep. 27, 2022 to Non Final Office Action mailed May 27, 2022", 10 pgs.
"U.S. Appl. No. 16/360,852, Corrected Notice of Allowability mailed Jun. 26, 2023", 3 pgs.
"U.S. Appl. No. 16/360,852, Final Office Action mailed Aug. 9, 2022", 24 pgs.
"U.S. Appl. No. 16/360,852, Non Final Office Action mailed Mar. 21, 2022", 24 pgs.
"U.S. Appl. No. 16/360,852, Non Final Office Action mailed Dec. 1, 2022", 25 pgs.
"U.S. Appl. No. 16/360,852, Notice of Allowance mailed Apr. 4, 2023", 10 pgs.
"U.S. Appl. No. 16/360,852, Response filed Mar. 1, 2023 to Non Final Office Action mailed Dec. 1, 2022", 10 pgs.
"U.S. Appl. No. 16/360,852, Response filed Jul. 21, 2022 to Non Final Office Action mailed Mar. 21, 2022", 10 pgs.
"U.S. Appl. No. 16/360,852, Response filed Nov. 9, 2022 to Final Office Action mailed Aug. 9, 2022", 10 pgs.
"U.S. Appl. No. 16/368,320, Non Final Office Action mailed Oct. 7, 2019", 14 pgs.
"U.S. Appl. No. 16/368,320, Notice of Allowance mailed Jan. 24, 2020", 7 pgs.
"U.S. Appl. No. 16/368,320, Response filed Jan. 7, 2020 to Non Final Office Action mailed Oct. 7, 2019", 9 pgs.
"U.S. Appl. No. 16/368,363, Non Final Office Action mailed Nov. 27, 2020", 7 pgs.
"U.S. Appl. No. 16/368,363, Notice of Allowance mailed Jun. 30, 2021", 7 pgs.
"U.S. Appl. No. 16/368,363, Response filed Feb. 26, 2021 to Non Final Office Action mailed Nov. 27, 2020", 7 pgs.
"U.S. Appl. No. 16/434,547, Corrected Notice of Allowability mailed Oct. 9, 2020", 2 pgs.
"U.S. Appl. No. 16/434,547, Notice of Allowance mailed Aug. 19, 2020", 11 pgs.
"U.S. Appl. No. 16/453,690, Examiner Interview Summary mailed Nov. 5, 2020", 3 pgs.
"U.S. Appl. No. 16/453,690, Final Office Action mailed Apr. 16, 2020", 19 pgs.
"U.S. Appl. No. 16/453,690, Non Final Office Action mailed Aug. 21, 2020", 15 pgs.
"U.S. Appl. No. 16/453,690, Non Final Office Action mailed Nov. 18, 2019", 15 pgs.
"U.S. Appl. No. 16/453,690, Notice of Allowance mailed Feb. 5, 2021", 8 pgs.
"U.S. Appl. No. 16/453,690, Response filed Jan. 21, 2020 to Non Final Office Action mailed Nov. 18, 19".
"U.S. Appl. No. 16/453,690, Response filed Jul. 16, 2020 to Final Office Action mailed Apr. 16, 2020", 11 pgs.
"U.S. Appl. No. 16/453,690, Response filed Nov. 2, 2020 to Non Final Office Action mailed Aug. 21, 2020", 11 pgs.
"U.S. Appl. No. 16/566,310, Corrected Notice of Allowability mailed Feb. 15, 2022", 3 pgs.
"U.S. Appl. No. 16/566,310, Corrected Notice of Allowability mailed Nov. 24, 2021", 3 pgs.
"U.S. Appl. No. 16/566,310, Non Final Office Action mailed Jun. 24, 2021", 18 pgs.
"U.S. Appl. No. 16/566,310, Notice of Allowance mailed Nov. 18, 2021", 11 pgs.
"U.S. Appl. No. 16/566,310, Response filed Oct. 25, 2021 to Non Final Office Action mailed Jun. 24, 2021", 9 pgs.
"U.S. Appl. No. 16/745,101, Final Office Action mailed Aug. 10, 2020", 11 pgs.
"U.S. Appl. No. 16/745,101, Non Final Office Action mailed Apr. 20, 2020", 9 pgs.
"U.S. Appl. No. 16/745,101, Notice of Allowance mailed Oct. 30, 2020", 12 pgs.
"U.S. Appl. No. 16/745,101, Response filed Jul. 20, 2020 to Non Final Office Action mailed Apr. 20, 2020", 9 pgs.
"U.S. Appl. No. 16/745,101, Response filed Oct. 13, 2020 to Final Office Action mailed Aug. 10, 2020", 8 pgs.
"U.S. Appl. No. 16/864,658, Non Final Office Action mailed Jun. 1, 2020", 17 pgs.
"U.S. Appl. No. 16/864,658, Notice of Allowance mailed Feb. 18, 2021", 10 pgs.
"U.S. Appl. No. 16/864,658, Notice of Allowance mailed Oct. 20, 2020", 8 pgs.
"U.S. Appl. No. 16/864,658, Preliminary Amendment filed May 4, 2020", 7 pgs.
"U.S. Appl. No. 16/864,658, Response filed Sep. 1, 2020 to Non Final Office Action mailed Jun. 1, 2020", 9 pgs.
"U.S. Appl. No. 16/917,167, Corrected Notice of Allowability mailed Feb. 16, 2022", 4 pgs.

(56) References Cited

OTHER PUBLICATIONS

"U.S. Appl. No. 16/917,167, Notice of Allowance mailed Oct. 20, 2021", 8 pgs.
"U.S. Appl. No. 16/917,167, Preliminary Amendment filed Jan. 13, 2021", 7 pgs.
"U.S. Appl. No. 16/997,524, Notice of Allowance mailed Oct. 28, 2020", 14 pgs.
"U.S. Appl. No. 17/247,054, Non Final Office Action mailed May 11, 2022", 17 pgs.
"U.S. Appl. No. 17/247,054, Notice of Allowance mailed Oct. 31, 2022", 9 pgs.
"U.S. Appl. No. 17/247,054, Preliminary Amendment filed Feb. 9, 2021", 7 pgs.
"U.S. Appl. No. 17/247,054, Response filed Aug. 11, 2022 to Non Final Office Action mailed May 11, 2022", 8 pgs.
"U.S. Appl. No. 17/248,719, Final Office Action mailed Nov. 17, 2022", 12 pgs.
"U.S. Appl. No. 17/248,719, Non Final Office Action mailed Aug. 5, 2022", 6 pgs.
"U.S. Appl. No. 17/248,719, Notice of Allowance mailed Apr. 4, 2023", 13 pgs.
"U.S. Appl. No. 17/248,719, Response filed Mar. 16, 2023 to Final Office Action mailed Nov. 17, 2022", 7 pgs.
"U.S. Appl. No. 17/248,719, Response filed Nov. 4, 2022 to Non Final Office Action mailed Aug. 5, 2022", 7 pgs.
"U.S. Appl. No. 17/339,394, Final Office Action mailed Jan. 17, 2023", 18 pgs.
"U.S. Appl. No. 17/339,394, Non Final Office Action mailed May 8, 2023", 15 pgs.
"U.S. Appl. No. 17/339,394, Non Final Office Action mailed Jul. 22, 2022", 10 pgs.
"U.S. Appl. No. 17/339,394, Notice of Allowance mailed Aug. 18, 2023", 8 pgs.
"U.S. Appl. No. 17/339,394, Response filed Apr. 17, 2023 to Final Office Action mailed Jan. 17, 2023", 11 pgs.
"U.S. Appl. No. 17/339,394, Response filed Aug. 8, 2023 to Non Final Office Action mailed May 8, 2023", 9 pgs.
"U.S. Appl. No. 17/339,394, Response filed Oct. 24, 2022 to Non Final Office Action mailed Jul. 22, 2022", 9 pgs.
"U.S. Appl. No. 17/346,065, Non Final Office Action mailed Aug. 4, 2022", 11 pgs.
"U.S. Appl. No. 17/346,065, Notice of Allowance mailed Dec. 9, 2022", 7 pgs.
"U.S. Appl. No. 17/346,065, PTO Response to Rule 312 Communication mailed Mar. 3, 2023", 2 pgs.
"U.S. Appl. No. 17/346,065, Response filed Nov. 4, 2022 to Non Final Office Action mailed Aug. 4, 2022", 8 pgs.
"U.S. Appl. No. 17/515,996, Final Office Action mailed Oct. 4, 2024", 8 pgs.
"U.S. Appl. No. 17/515,996, Non Final Office Action mailed Mar. 21, 2024", 8 pgs.
"U.S. Appl. No. 17/515,996, Non Final Office Action mailed Oct. 6, 2023", 6 pgs.
"U.S. Appl. No. 17/515,996, Preliminary Amendment filed Sep. 19, 2022", 6 pgs.
"U.S. Appl. No. 17/515,996, Response filed Jun. 18, 2024 to Non Final Office Action mailed Mar. 21, 2024", 8 pgs.
"U.S. Appl. No. 17/515,996, Response filed Dec. 2, 2023 to Non Final Office Action mailed Oct. 6, 2023", 7 pgs.
"U.S. Appl. No. 17/694,387, Non Final Office Action mailed Jan. 17, 2023", 6 pgs.
"U.S. Appl. No. 17/694,387, Notice of Allowance mailed Jul. 5, 2023", 7 pgs.
"U.S. Appl. No. 17/694,387, Preliminary Amendment filed Sep. 20, 2022", 6 pgs.
"U.S. Appl. No. 17/694,387, Response filed Apr. 17, 2023 to Non Final Office Action mailed Jan. 17, 2023", 7 pgs.
"U.S. Appl. No. 17/713,043, Corrected Notice of Allowability mailed Jun. 5, 2023", 2 pgs.
"U.S. Appl. No. 17/713,043, Non Final Office Action mailed Oct. 5, 2022", 9 pgs.
"U.S. Appl. No. 17/713,043, Notice of Allowance mailed Jan. 31, 2023", 9 pgs.
"U.S. Appl. No. 17/713,043, Preliminary Amendment filed Sep. 20, 2022", 8 pgs.
"U.S. Appl. No. 17/713,043, Response filed Jan. 3, 2023 to Non Final Office Action mailed Oct. 5, 2022", 9 pgs.
"U.S. Appl. No. 18/165,632, Non Final Office Action mailed Jun. 20, 2023", 23 pgs.
"U.S. Appl. No. 18/165,632, Notice of Allowance mailed Oct. 17, 2023", 9 pgs.
"U.S. Appl. No. 18/165,632, Response filed Sep. 20, 2023 to Non Final Office Action mailed Jun. 20, 2023", 9 pgs.
"U.S. Appl. No. 18/322,067, Final Office Action mailed May 31, 2024", 8 pgs.
"U.S. Appl. No. 18/322,067, Non Final Office Action mailed Nov. 9, 2023", 21 pgs.
"U.S. Appl. No. 18/322,067, Notice of Allowance mailed Sep. 9, 2024", 9 pgs.
"U.S. Appl. No. 18/322,067, Response filed Feb. 9, 2024 to Non Final Office Action mailed Nov. 9, 2023", 12 pgs.
"U.S. Appl. No. 18/322,067, Response filed Jul. 31, 2024 to Final Office Action mailed May 31, 2024", 8 pgs.
"U.S. Appl. No. 18/343,517, Corrected Notice of Allowability mailed Oct. 2, 2024", 2 pgs.
"U.S. Appl. No. 18/343,517, Notice of Allowance mailed Sep. 20, 2024", 12 pgs.
"U.S. Appl. No. 18/347,287, Non Final Office Action mailed Sep. 6, 2024", 23 pgs.
"U.S. Appl. No. 18/450,110, Non Final Office Action mailed Mar. 7, 2024", 25 pgs.
"U.S. Appl. No. 18/450,110, Notice of Allowance mailed Jul. 15, 2024", 7 pgs.
"U.S. Appl. No. 18/450,110, Response filed Jun. 5, 2024 to Non Final Office Action mailed Mar. 7, 2024", 10 pgs.
"U.S. Appl. No. 18/516,785, Non Final Office Action mailed Jun. 24, 2024", 11 pgs.
"U.S. Appl. No. 18/516,785, Notice of Allowance mailed Sep. 30, 2024", 9 pgs.
"U.S. Appl. No. 18/516,785, Response filed Sep. 23, 2024 to Non Final Office Action mailed Jun. 24, 2024", 9 pgs.
"Country Counter", appadvice.com, (2014), 4 pgs.
Ackerman, Eduardo Jacobo Miranda, et al., "Dynamic Group Generation Based On Interests", Technische Universitat Dresden, (Oct. 2009), 93 pgs.
Chen, Mei-Hua, et al., "Augmentable Paraphrase Extraction Framework", Proceedings of the Sixth International Joint Conference on Natural Language Processing, (2013), 6 pgs.
Gjoreski, Martin, et al., "Predicting the Arrival and the Departure Time of an Employee", Preko 5000 letslovenske inovativnosti., (2013), 5 pgs.
Halstead, Susanne H, et al., "Finding top ui/ux design talent on adobe behance", Procedia Computer Science 51, (2015), 9 pgs.
Kostakos, Vassilis, et al., "Whos Your Best Friend Targeted Privacy Attacks in Location Sharing Social Networks", Proceedings of the 13th international conference on Ubiquitous computing, (Sep. 2011), 11 pgs.
Kuusik, Siim, "My All Time Favourite App for iPhone—Fog Of World", [Online] Retrieved from the Internet: <URL: https://www.youtube.com/watch?v=L4L7Cn13pfl>, (Oct. 5, 2017), 2 pgs.
Mahdavi, Ardeshir, et al., "Predicting people's presence in buildings: An empirically based model performance analysis.", Energy and Buildings, 86, (2015), 349-355.
Mapzen, "Refill-Levels of Detail", Mapzen.com, [Online] Retrieved from the internet: <https://www.mapzen.com/blog/refill-levels-of-detail-and-labels/>, (2017), 9 pgs.
Mitchell, Brian, "Fog of World 2", [Online] Retrieved from the Internet: <URL: https://brianm.me/posts/fog-of-world-2>, (Nov. 12, 2016), 16 pgs.
Peter, "Countries Been—an App to Track Your Globetrotting", [Online] Retrieved from the Internet: <URL: https://gatetoadventures.com/countries-app-track-globetrotting/>, (2017), 13 pgs.

(56) References Cited

OTHER PUBLICATIONS

Pham, Manh Cuong, et al., "Enhancing academic event participation with context-aware and social recommendations", IEEE/ACM International Conference on Advances in Social Networks Analysis and Mining. IEEE, (2012), 8 pgs.
Phandroid, "How to track your Family with Life360", [Online]. Retrieved from the Internet: <https://www.youtube.com/watch?v=6DiJ1qFugN8>, (2016), 1 pg.
Phithakkitnukoon, Santi, et al., "Activity-Aware Map: Identifying human daily activity pattern using mobile phone data", In International workshop on human behavior understanding (pp. 14-25). Springer, Berlin, Heidelberg., (2010), 13 pgs.
Shang, Yanmin, et al., "A New Interest Sensitive and Network Sensitive Method for User Recommendation", IEEE Eighth International Conference on Networking, Architecture and Storage, (2013), 5 pgs.
Xiang, Rongjing, et al., "Modeling Relationship Strength In Online Social Networks", Proceedings of the 19th international conference on World wide web, (Apr. 2010), 10 pgs.
Xing, Wenpu, et al., "Weighted Pagerank Algorithm", Proceedings Second Annual Conference on Communication Networks and Services Research IEEE, (2004), 10 pgs.
Zheng, Yu, "Location Based Social Networks Users", Computing With Spatial Trajectories Springer, (Jan. 2011), 34 pgs.

* cited by examiner

EDGE GESTURE INTERFACE WITH SMART INTERACTIONS

PRIORITY CLAIM

This application is a continuation of U.S. patent application Ser. No. 18/133,454, filed Apr. 11, 2023, which application is a continuation of U.S. patent application Ser. No. 17/722,886, filed Apr. 18, 2022, now issued as U.S. Pat. No. 11,714,535, which application is a continuation of U.S. patent application Ser. No. 16/946,946, filed Jul. 13, 2020, now issued as U.S. Pat. No. 11,307,747, which application claims the benefit of priority of U.S. Provisional Patent Application No. 62/873,077, filed Jul. 11, 2019, which are hereby incorporated by reference herein in their entirety.

BACKGROUND

The popularity of location sharing, particularly real-time location sharing, used in conjunction with a social networking application continues to grow. Users increasingly share their location with each other facilitated by dynamically updated map interfaces. Navigating map interfaces can at times present users with difficulties, particularly when the user has the use of only one hand. In the absence of a convenient input interface, the user's facility for interacting with shared location-based information is impeded. Embodiments of the present disclosure address these and other issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
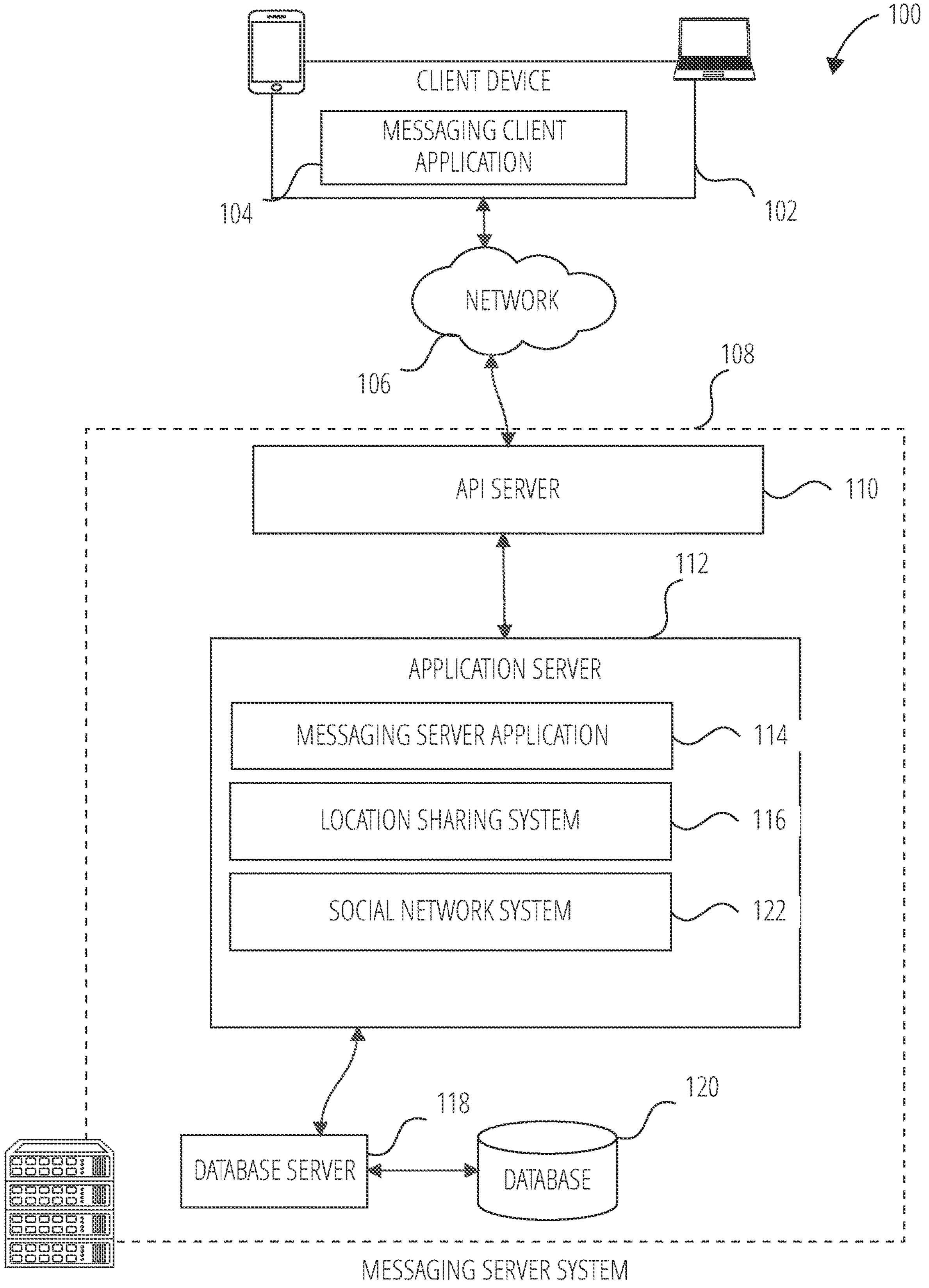
FIG. 1 is a diagrammatic representation of a networked environment in which a portable display device of the present disclosure may be deployed, in accordance with some example embodiments.

Embodiments of the present disclosure provide a geographically-based graphical user interface (GUI) suited to single-handed operation of a portable display device. This user interface may be referred to herein as a "map GUI," and may be used in conjunction with a location-sharing system.

Various embodiments of the present disclosure provide systems, methods, techniques, instruction sequences, and computing machine program products for dynamically displaying a map GUI of a computer system. The locations of participants of a communication session established via a messaging system, in particular an instant messaging system may be shared through such a map GUI.

Map data and user location data may be displayed and/or updated in real-time or almost real-time. However, where different users are close together or where the map data represents an entire city, for example, the user often desires to increase the scale (i.e. "zoom in") of the displayed map to allow greater map or user location detail to be discerned. In other scenarios, the opposite requirement is called for: the user may also wish to decrease the scale (i.e. "zoom out") of the displayed map to allow the broader context of the map data and/or geographic distribution of user locations to be identified.

Conventional map GUIs provide a zoom interaction in which the scale at which the map data is presented is altered in proportion with a measured value of a characteristic of a touchscreen gesture. Examples of such measured values include the change in distance between two distinct touch points in the so-called "pinch-to-zoom" mechanic, or the vertical distance covered in a single sliding gesture vertically upwards at the vertical edge of a touchscreen in the "edge zoom" mechanic.

The edge zoom mechanic facilitates single handed use, in which a single hand both grips the portable display device and a digit of the same hand touches a touchscreen to provide the sliding gesture. For example, the continuous sliding gesture is made by swiping the tip of the thumb along the screen edge while the map GUI presents map data.

The zoom interaction is not the only mode of interaction a user may wish to have with the map GUI. The user may additionally or alternatively wish to view a projection of a three-dimensional representation of a selected map location (i.e. "tilt mode"). In certain cases, the user may wish to view such a projection from a different angle relative to the map plane (i.e. tilt angle) rather than viewing the projection from directly overhead. Certain map applications include a facility for altering the tilt of user's line of sight.

Additionally or alternatively, the user may wish to rotate the map data presented on the screen of the portable display device (i.e. "rotation" mode), so that, for example, the user may orient the map data in a convenient manner. Rotation is typically achieved by applying a twisting gesture in the pinch-to-zoom mechanic—an action which is inconvenient, if not impossible, in single handed operation.

Some embodiments provide various improvements over conventional geographically-based user interfaces by extending the range of interaction modes available to the user through user input from a single digit of a single hand.

Some embodiments provide for the recognition of the handedness of the one-handed user. Left-handed and right-handed operation may be distinguished and the subsequent input processed accordingly.

Some embodiments provide further improvements over conventional user interfaces by combining data from multiple data sources. This multiple data sources may be of different nature, for example, a geographical map data source and a user-related data source.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some embodiments, a communication session is established via a messaging system between a plurality of participants. The messaging system receives, from a client device of a participant, via a wireless communication over a network, an electronic communication containing location information of the client device. The messaging system determines, based on the location information, a current location of the participant. The messaging system displays, on display screens of client devices of the other participants of the communication session, an indication of the location of the participant within a messaging user interface (messaging UI). In various embodiments, the collection and sharing of location information is presented as a selectable option within privacy settings of a device or application.

The present disclosure provides various improvements over conventional user interfaces. According to some embodiments, a multi-modal geographically-based user interface (map UI) is provided, thereby providing a more convenient interface for single-handed operation of a portable display device. Furthermore, the provided interface facilitates the combination of gestures in different input modes, improving the speed of a user's navigation of the map and user location data (e.g. navigating within the map UI to access the location of the participants) and ultimately making more efficient use of resources (processor, battery, screen space, and other such resources).

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, map data, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes a location sharing system 116 supporting a geographically-based GUI (i.e. map UI). In some embodiments, the geographically-based GUI may include, in addition to map data representing a portion of a geographic map, representations of at least approximate respective positions of a user of client device 102 and of other users (e.g. the positions of a user's friends in a social network graph accessed by the social media application) using avatars for each respective user.

The social network system 122 may receive user authorization to use, or refrain from using, the user's location information. In some embodiments, the social network system 122 may likewise opt to share or not share the user's location with others via the map UI. In some cases, the user's avatar may be displayed to the user on the display screen of the user's computing device regardless of whether the user is sharing his or her location with other users.

In some embodiments, when viewing the map UI, the user is able to see the location of all his/her friends that have shared their location with the user on the map, each friend represented by their respective avatar.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map UI. For example, the system may allow the user to chat with the user's friends without leaving the map. In one particular example, the user may select a chat icon from a menu presented in conjunction with the map UI to initiate a chat session.

The application server 112 is communicatively coupled to a database server 118, which facilitates access to a database 120 in which is stored data associated with messages processed by the messaging server application 114.

Figure 2:
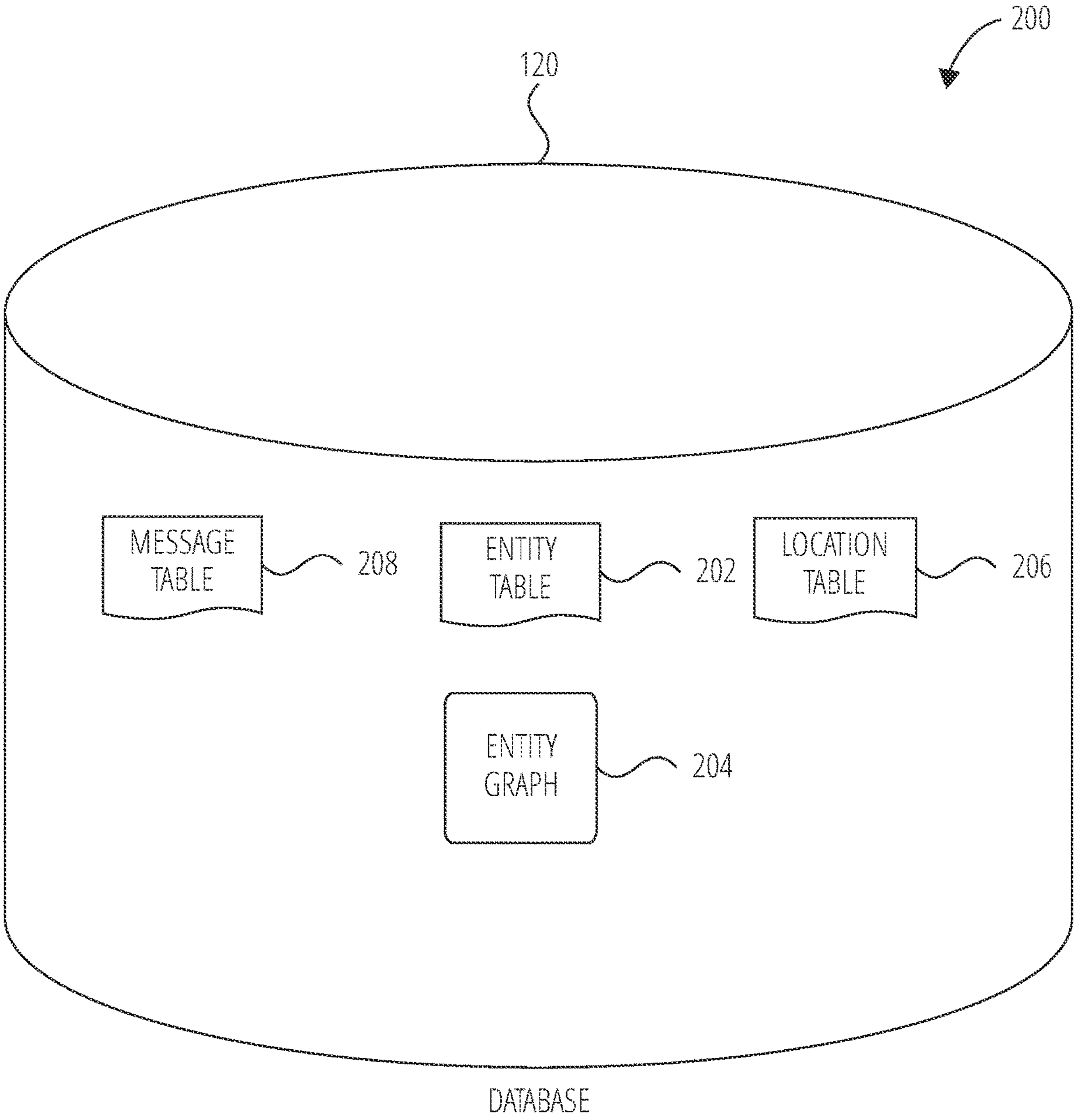
FIG. 2 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 204 (as shown in FIG. 2) within the database 120. Examples of functions and services supported by the social network system 122 include the identification of other users of the messaging system 100 with which a particular user has relationships or is "following", and also the identification of other entities and interests of a particular user.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 208. An entity table 202 stores entity data, including an entity graph 204. Entities for which records are maintained within the entity table 202 may include individuals (e.g., users), corporate entities, organizations, objects, places, events, etc. Regardless of type, any entity regarding which the messaging server system 108 stores data may be a recognized entity. Each entity is provided with a unique identifier, as well as an entity type identifier (not shown). The entity graph 204 furthermore stores information regarding relationships and associations between entities. Such relationships may be social, professional (e.g., work at a common corporation or organization) interested-based or activity-based, merely for example. A location table 206 stores historical and current location information of users (e.g., geolocation information determined by the position components 538 of the client device 102).

Figure 3:
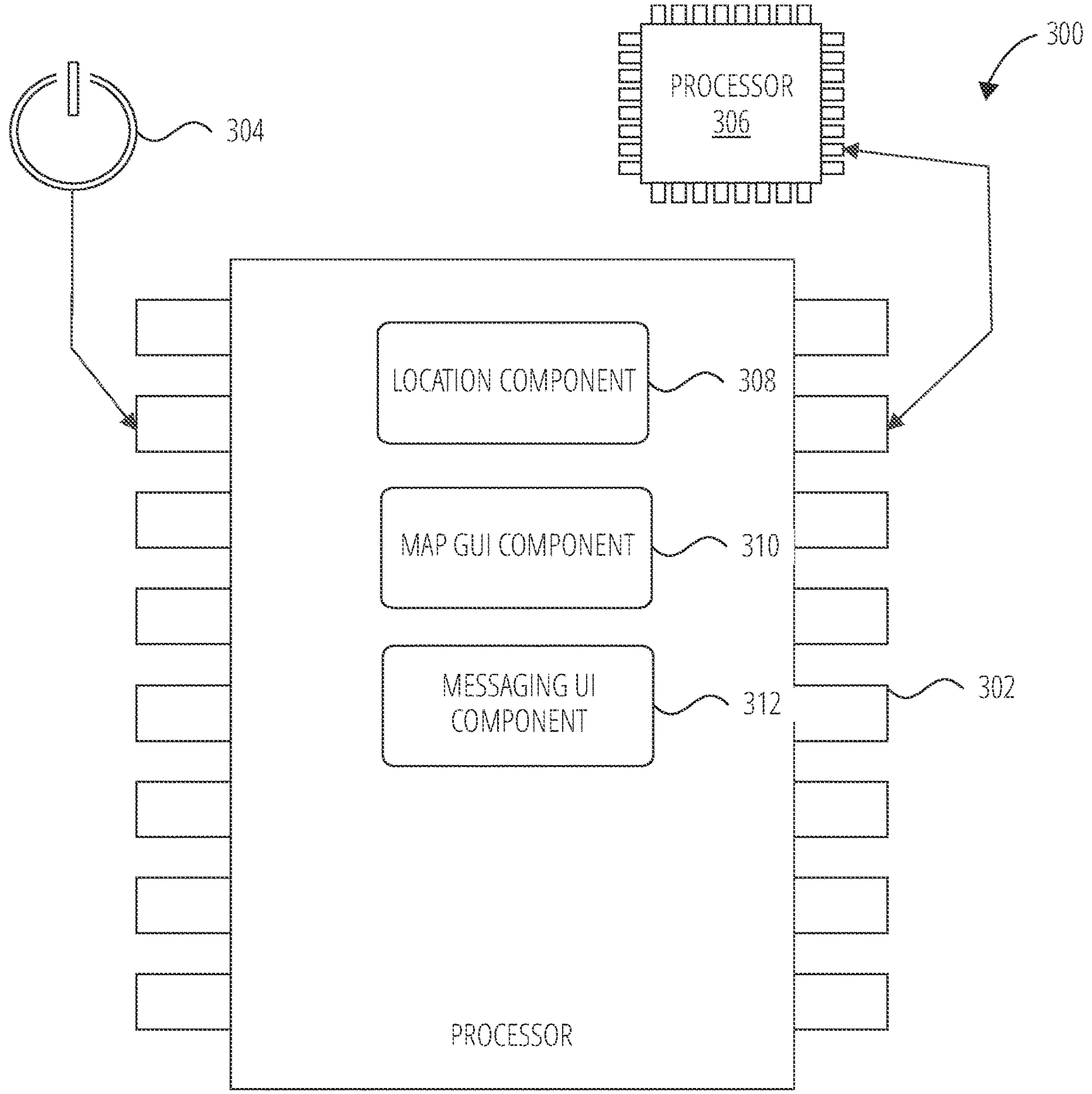
FIG. 3 is a diagrammatic representation of a processing environment, in accordance with some example embodiments.

Turning now to FIG. 3, there is shown a diagrammatic representation of a processing environment 300, which includes at least a processor 302 (e.g., a GPU, CPU or combination thereof).

The processor 302 is shown to be coupled to a power source 304, and to include (either permanently configured or temporarily instantiated) modules, namely a location component 308, a map UI component 310, and a messaging UI component 312. The location component 308 operationally determines locations of users based on location information. The map UI component 310 operationally generates user interfaces and causes the user interfaces to be displayed on client devices. The messaging UI component 312 operationally generates user interfaces and causes the user interfaces to be displayed on client devices. As illustrated, the processor 302 may be communicatively coupled to another processor 306.

Figure 4:
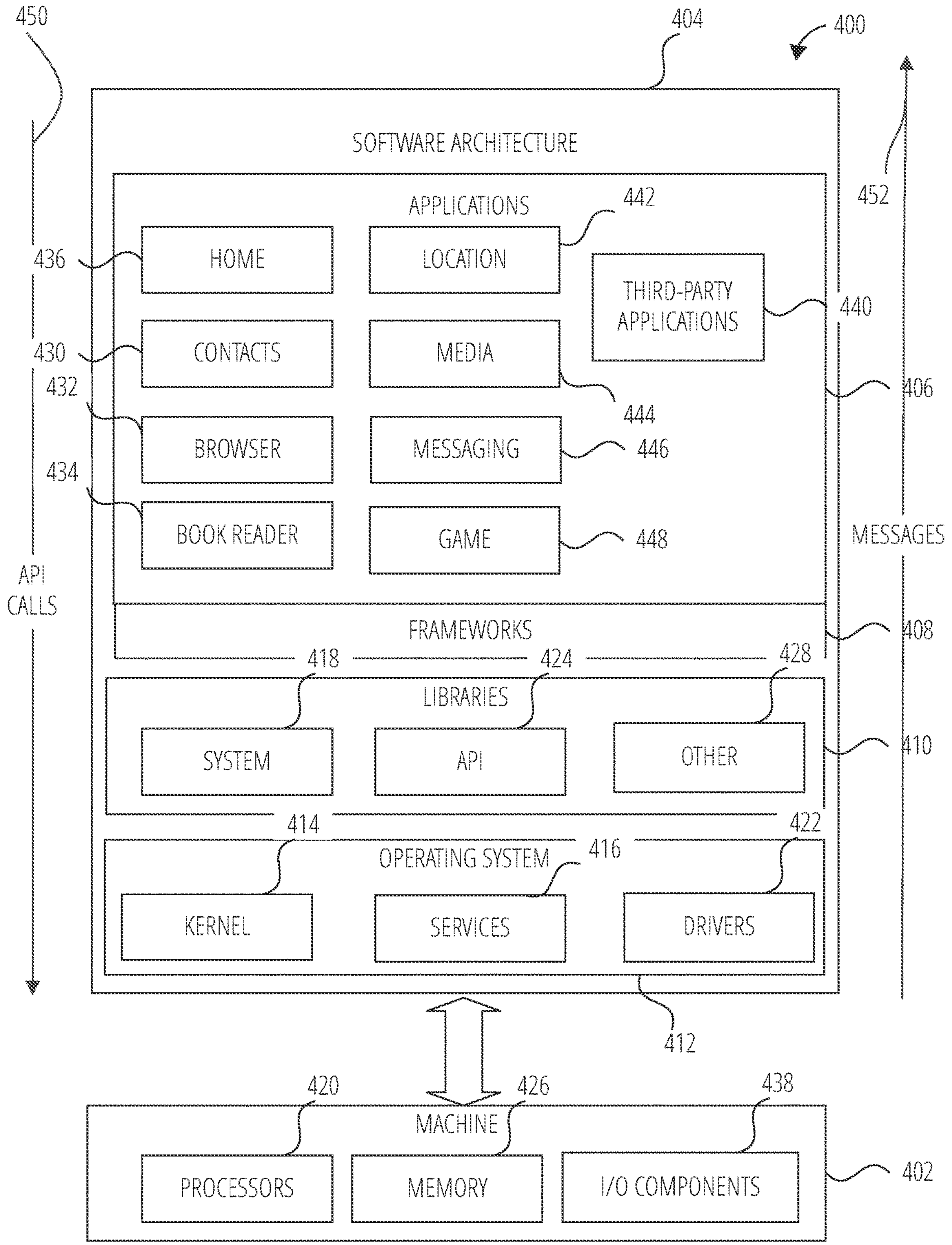
FIG. 4 is block diagram showing a software architecture within which the present disclosure may be implemented, in accordance with some example embodiments.

FIG. 4 is a block diagram 400 illustrating a software architecture 404, which can be installed on any one or more of the devices described herein, in particular upon the client device 102. The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionality. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 410 provide a low-level common infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 406.

The frameworks 408 provide a high-level common infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example embodiment, the applications 406 may include a home application 436, a contacts application 430, a browser application 432, a book reader application 434, a location application 442, a media application 444, a messaging application 446, a game application 448, and a broad assortment of other applications such as third-party applications 440. The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party applications 440 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 440 can invoke the API calls 450 provided by the operating system 412 to facilitate functionality described herein.

The location application 442, when executed, may implement the geographically-based GUI, which in turn may cause the display of map data and user location data.

Figure 5:
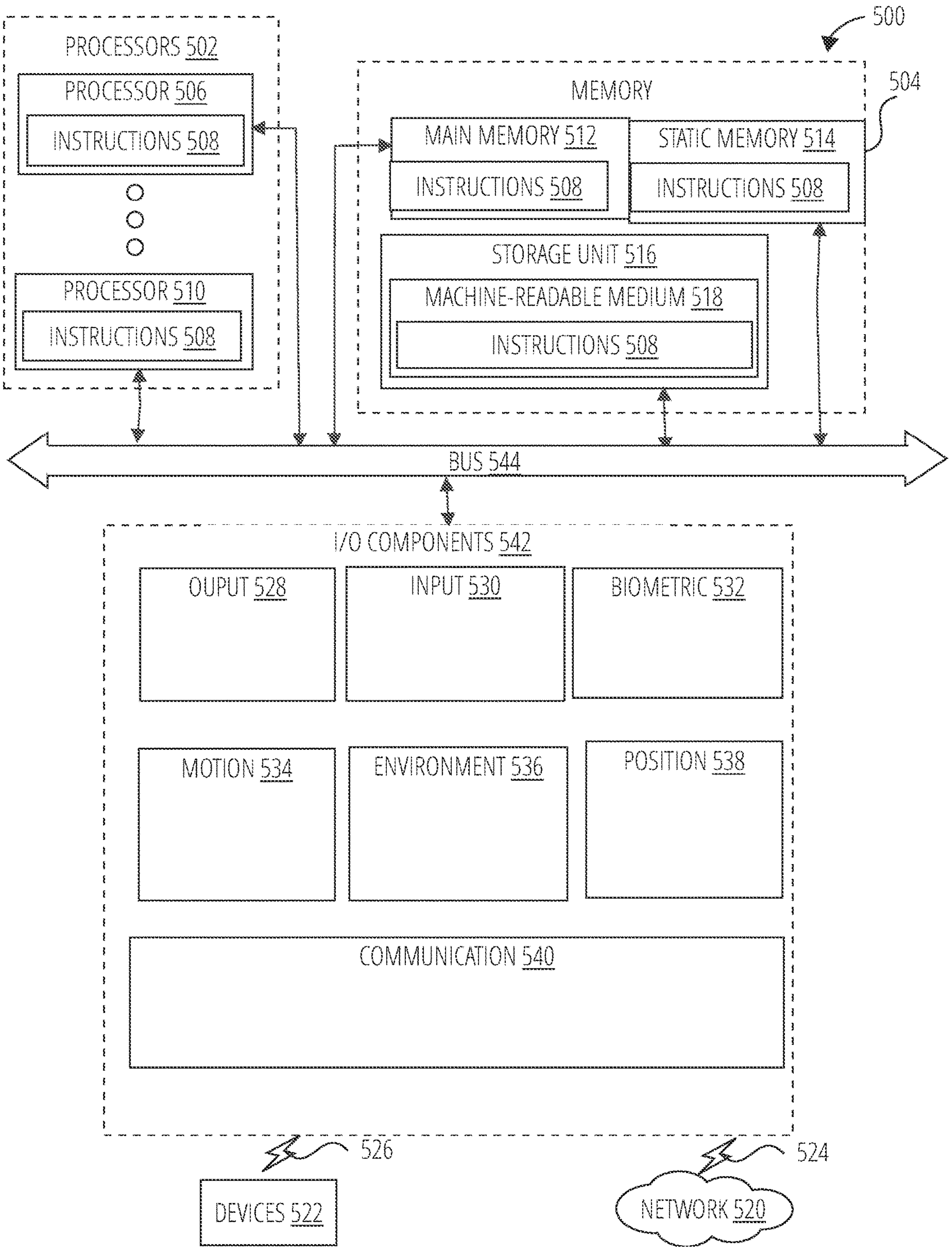
FIG. 5 is a diagrammatic representation of a machine, in the form of a computer system within which a set of instructions may be executed for causing the machine to perform any one or more of the methodologies discussed, in accordance with some example embodiments.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and I/O components 542, which may be configured to communicate with each other via a bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms. It will be appreciated that the I/O components 542 may include many other components that are not shown in FIG. 5. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In certain classes of machine, it may be convenient to provide integrated I/O components that operate as both input and output components. In portable machines such as mobile phones, a touch input device may be integrated with a display device to provide a touchscreen display. Such touchscreen display devices may allow the user to input commands as hand, stylus or finger gestures that are visually associated with elements displayed in a graphical user interface. The resulting graphical user interface is thus convenient and intuitive for non-expert users.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects, as well as optical, ultrasonic, capacitive or and magnetic sensors), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, and/or memory of the processors 502) and/or storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

Figure 6:
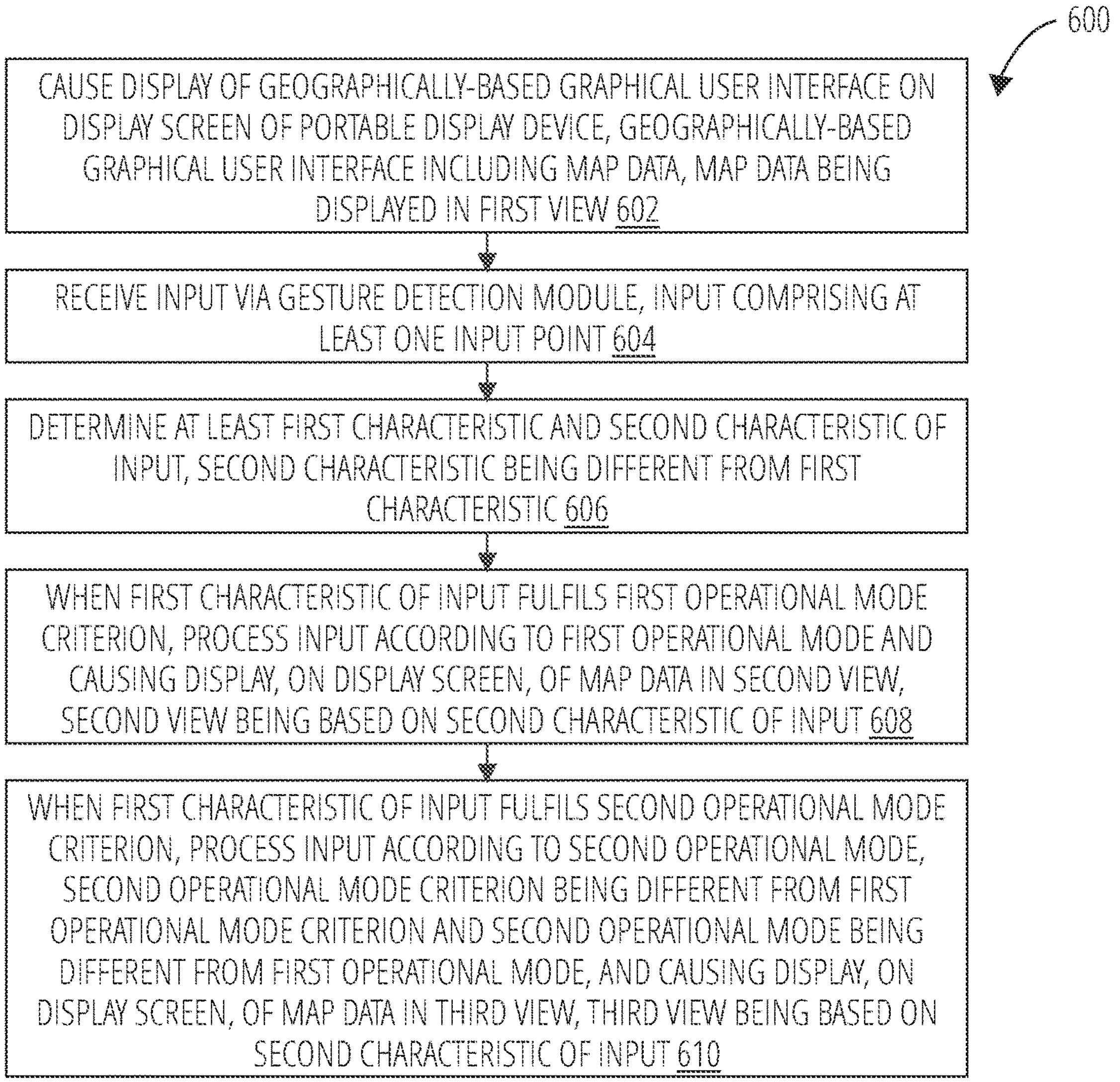
FIG. 6 illustrates a method in accordance with some example embodiments.

FIG. 6 is a flowchart illustrating a method 600 for presenting map data via a geographically-based user interfaces. Where user location data is available, the method further facilitates sharing of the respective locations of other users. The method 600 may be embodied in computer-readable instructions for execution by one or more processors (e.g., processor 302) such that the steps of the method 600 may be performed in part or in whole by functional components (e.g., location component 308, map UI component 312, messaging UI component 312) of a client device 102 with a processing environment 300; accordingly, the method 600 is described below by way of example with reference thereto. However, the method 600 may be deployed on various other hardware configurations and is not intended to be limited to the functional components of the processing environment 300.

In operation 602, a processor of a portable display device causes the display of a geographically-based graphical user interface on a display screen of the portable display device. The geographically-based graphical user interface includes map data. The map data may be displayed in a first view, i.e. from a particular perspective, projection or point of view and at a particular scale.

In operation 604, the processor receives input via a gesture detection module, the input comprising at least one input point. In some embodiments, the input is a swipe-touch gesture where the user's finger contacts the touchscreen of the portable display device at a first location on the screen, maintains contact as a finger movement is executed, and then ceases contact at a second location on the screen. In some embodiments, the level of finger pressure is measured during a touch gesture so that the input is a long-press gesture where the user's finger contacts the touchscreen of the portable display device, maintains contact while applying a varying amount of pressure, and then ceases contact on the screen. In some embodiments, the input comprises a time-separated sequence of input points provided in single-handed operation of the portable display device. The single-handed operation may be operation by the right hand or by the left hand alone of the user.

In operation 606, the processor determines at least a first characteristic and a second characteristic of the input, where the second characteristic is different from the first characteristic. Examples of first and second characteristic include: horizontal displacement (X) of an initial input point relative to a point at an edge of the display screen; a count of the number of tap gestures in a predetermined period of time; a duration of a single press touch; a measure of the pressure applied in a press touch; vertical displacement (Y) relative to an initial point in the map data; and vertical speed ($v_y$) or horizontal speed ($v_x$) of a displacement from an initial input point to a subsequent input point in the input.

In some embodiments, the first operational mode criterion may be fulfilled when the first characteristic takes a value in a first range of values. Additionally, the second operational mode criterion may be fulfilled when the first characteristic takes a value in a second range of values.

When it is determined that the first characteristic of the input fulfils a first operational mode criterion, the processor processes the input according to a first operational mode and causing the display screen to display the map data in a second view, the second view being based on the second characteristic of the input (operation 608). In some embodiments, the second view may differ from the first view in respect of at least one of perspective, projection or point of view and scale.

In operation 610, when it is determined the first characteristic of the input fulfils a second operational mode criterion, the processor processes the input according to a second operational mode. The second operational mode criterion is different from the first operational mode criterion and the second operational mode is different from the first operational mode. The processor then causes the display screen to display the map data in a third view, the third view being based on the second characteristic of the input. In some embodiments, the third view may differ from the first and the second view in respect of at least one of perspective, projection or point of view and scale.

In some embodiments, the first operational mode and the second operational mode may each be selected from a group of operational modes including a tilt operation mode, a rotate operation mode, a drag operation mode, and a zoom operation mode.

In certain embodiments, processing the input according to the tilt operation mode may comprise changing the angle of tilt of a projection of the map data displayed on the display screen from a default tilt angle to an input tilt angle proportional to the second characteristic of the input.

In certain embodiments, processing the input according to the rotate operation mode may comprise changing the orientation of the map data displayed on the display screen from a default orientation angle to an input rotation angle proportional to the second characteristic of the input.

In certain embodiments, processing the input according to the drag operation mode may comprise moving a center coordinate of the display screen relative to a default coordinate in the map data from the default coordinate to an input coordinate along a predetermined path, the magnitude of movement being proportional to the second characteristic of the input.

In certain embodiments, processing the input according to the zoom operation mode may comprise changing the orientation of the map data displayed on the display screen from a default scale to an input scale proportional to the second characteristic of the input.

In certain embodiments, the geographically-based graphical user interface may further include user location data for at least one user, the user location data being displayed in at least one of the first view, second view or third view by depicting an avatar associated with the at least one user.

In certain embodiments, the first operational mode criterion may be fulfilled when the first characteristic takes a value at an initial input point, regardless of the value of first characteristic taken by subsequent input points of the input.

In certain embodiments, the first operational mode criterion may be fulfilled when the first characteristic takes a value at an initial input point and the value of first characteristic taken by subsequent input points of the input remains within a tolerance range encompassing, and wider than, the first range of values.

In certain embodiments, the operation of the geographically-based graphical user interface in a given operational mode is indicated through the display of at least one graphical element over the map data of the geographically-based graphical user interface in a color or pattern corresponding to the respective operational mode.

In certain embodiments, the first characteristic is horizontal displacement (X) of an initial input point relative to a point at an edge of the display screen. In such embodiments, the first operational mode criterion may be fulfilled when the horizontal displacement takes a value in a first range of values. Additionally, the second operational mode criterion may be fulfilled when the horizontal displacement takes a value in a second range of values. In certain such embodiments, the second characteristic is vertical displacement (Y) relative to an initial point in the map data. FIGS. 7 to 12 illustrate various aspects of these embodiments.

Figure 7:
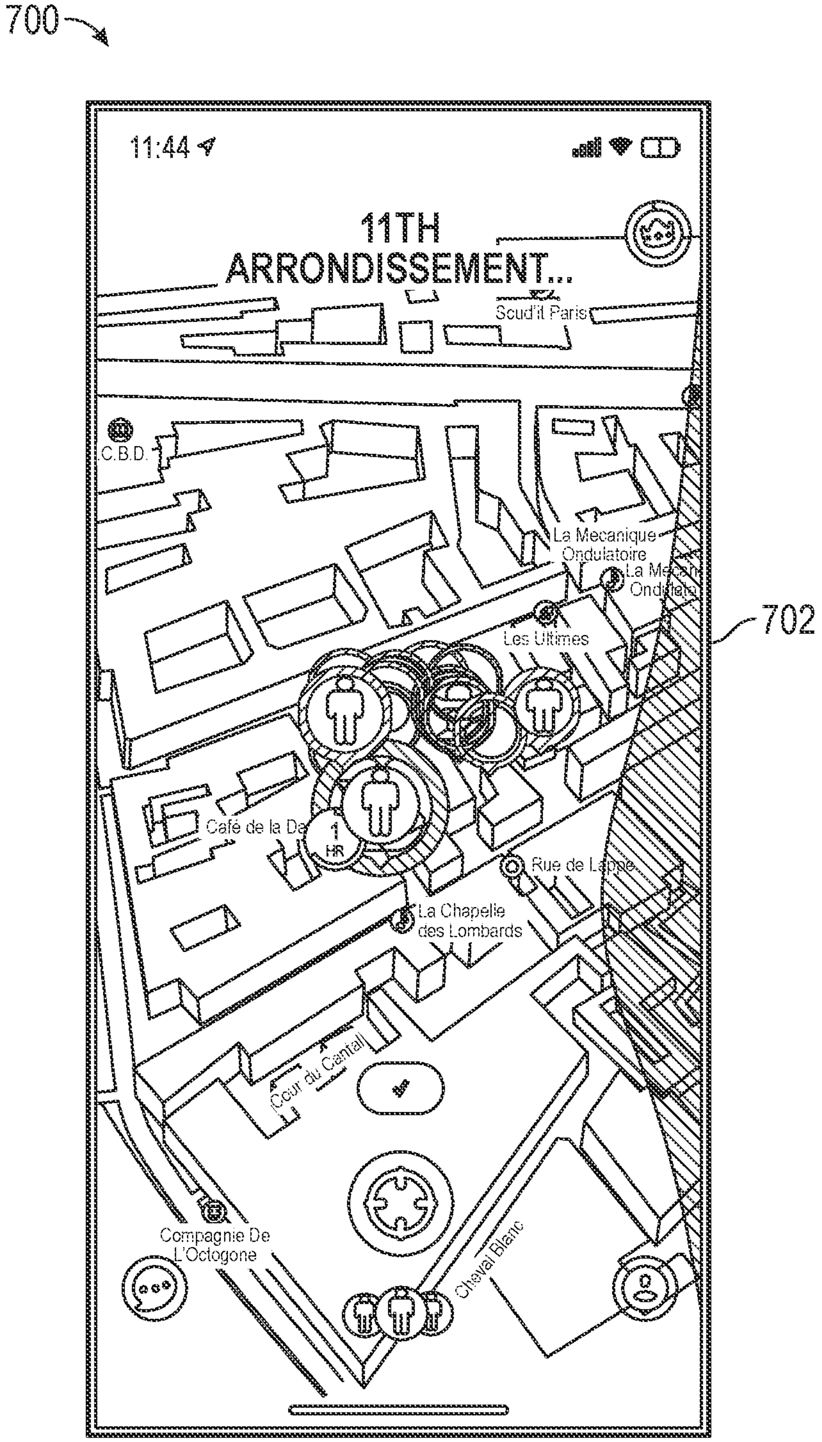
FIG. 7 illustrates a user interface in a zoom operation mode displayed on a display screen of a portable display device, in accordance with some example embodiments.
Figure 8:
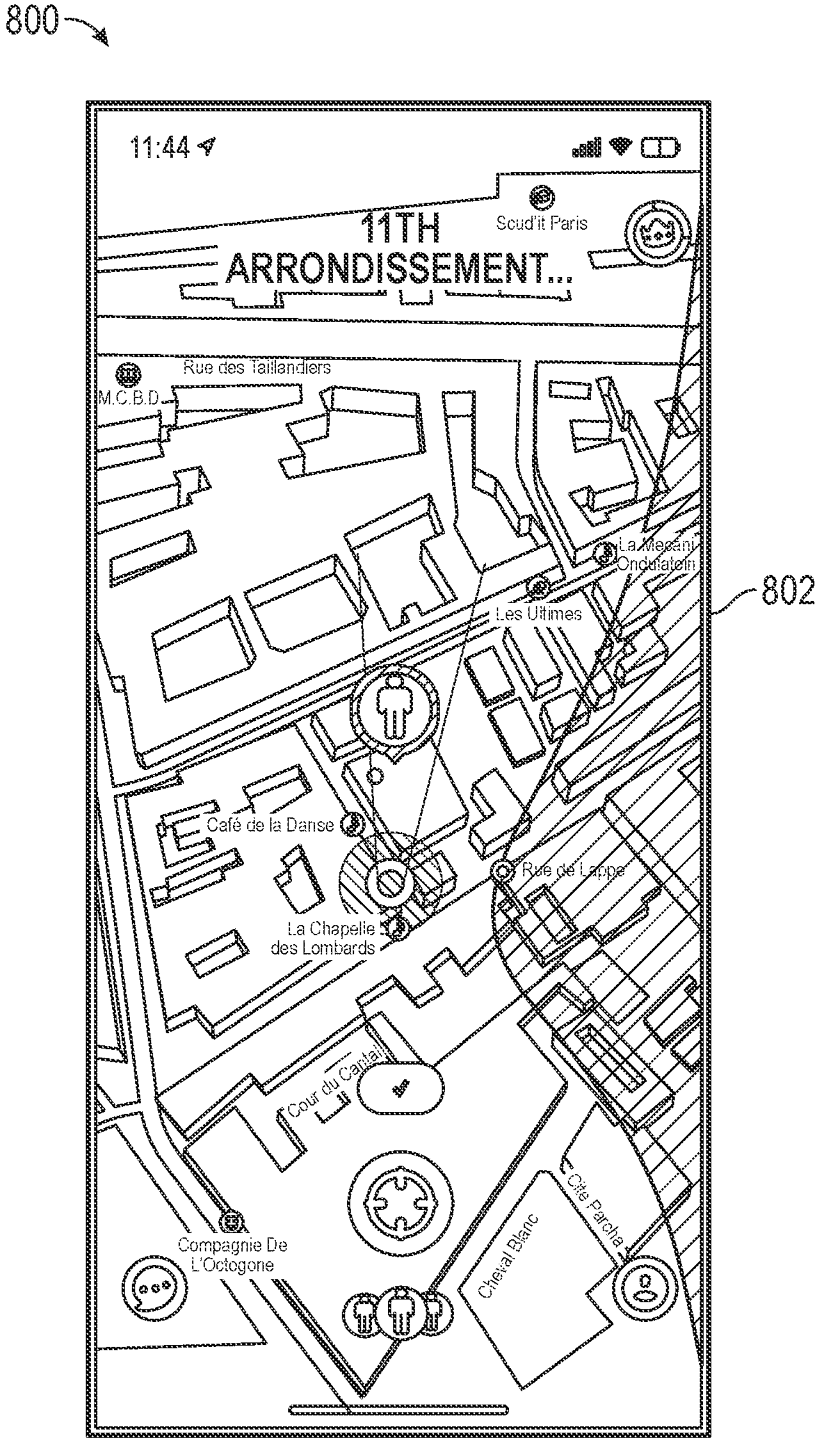
FIG. 8 illustrates a user interface in a tilt operation mode displayed on a display screen of a portable display device, in accordance with some example embodiments.
Figure 9:
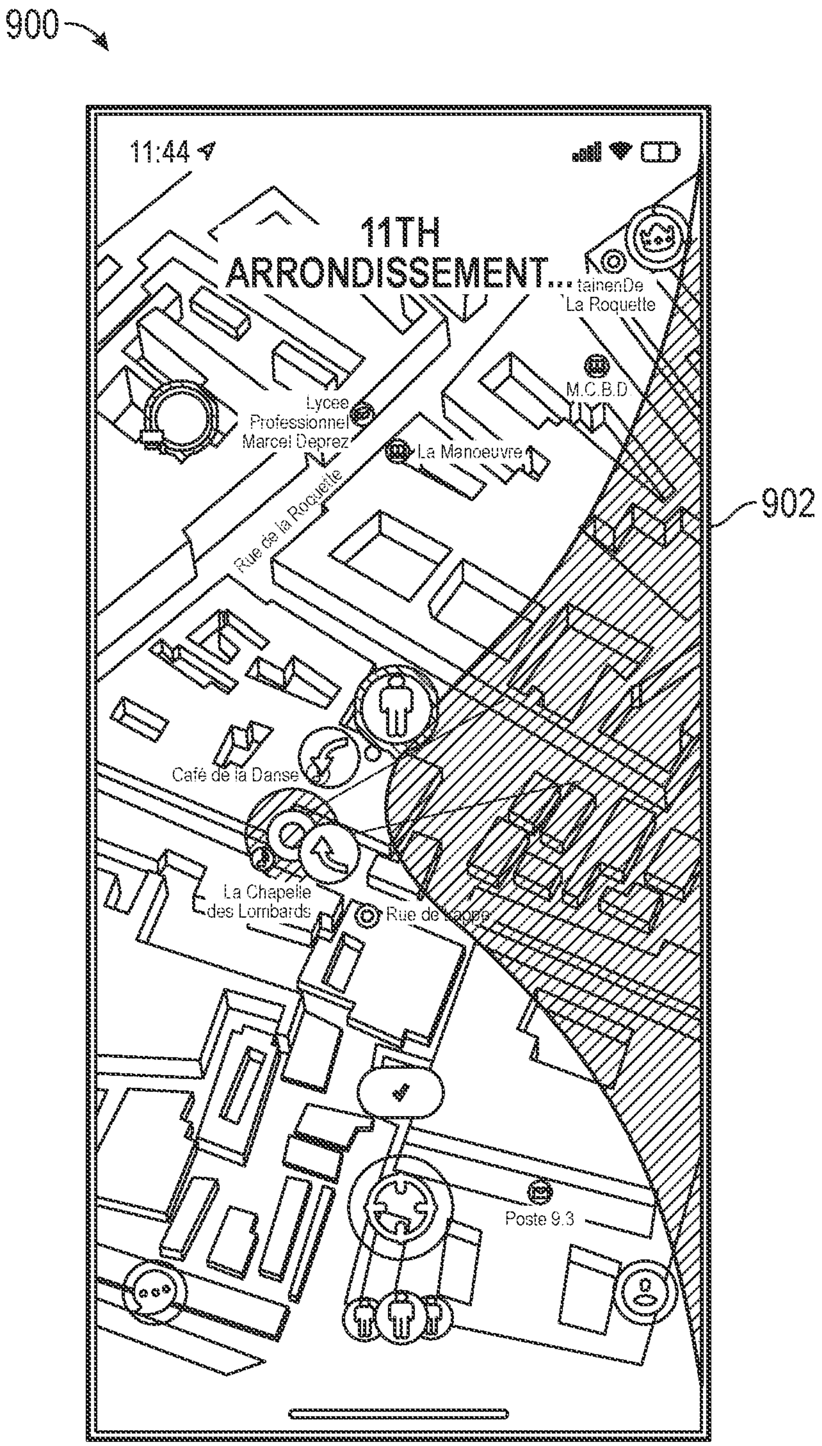
FIG. 9 illustrates a user interface in a rotate operation mode displayed on a display screen of a portable display device, in accordance with some example embodiments.

As shown in FIGS. 7 to 9, the input of a (right-handed) user is displayed as a partially transparent lobe component extending from the right-hand side of an example map GUI and overlaying map data in a first view. The furthest extent of the lobe component leftwards from the edge together with its vertical position corresponds to the current position at which the user is touching a touchscreen of a display device displaying the example map GUI.

FIG. 7 illustrates the map GUI in zoom operation mode. The horizontal displacement 702 of the leftwards lobe component is seen to be within a relatively short distance from the right-hand edge, in a range from $0>X>X_1$, where $X_1$ is the boundary of the range of horizontal displacement values associated with a zoom operation mode. Vertical displacement (Y) of the point at which the user touches the touchscreen in zoom operation mode is interpreted as an indication of the desired level of zoom (i.e. map scale). In some embodiments, the vertical displacement relative to the lower edge of the screen is in linear proportion to the desired level of zoom. In some embodiments, the vertical displacement relative to the lower edge of the screen is in logarithmic proportion to the desired level of zoom.

FIG. 8 illustrates the map GUI in tilt operation mode. The horizontal displacement 802 of the leftwards lobe component is seen to be within a distance from the right-hand edge, in a range from $X_1>X>X_2$, where $X_2$ is the upper boundary of the range of horizontal displacement values associated with a tilt operation mode. The underlying map data is seen to be viewed in a second view, presenting the map data in a three-dimensional projection having a lower viewing angle than in the first view illustrated in FIG. 7. Vertical displacement (Y) of the point at which the user touches the touchscreen in tilt operation mode is interpreted as an indication of the desired viewing angle (i.e. angle of tilt relative to a normal viewing angle from directly above).

FIG. 9 illustrates the map GUI in rotate operation mode. The horizontal displacement 902 of the leftwards lobe component is seen to be within a distance from the right-hand edge, in a range from $X_2>X>X_3$, where $X_3$ is the upper boundary of the range of horizontal displacement values associated with a rotate operation mode. For the sake of illustration, the underlying map data is overlaid by an indicator of rotation. Vertical displacement (Y) of the point at which the user touches the touchscreen in zoom operation mode is interpreted as an indication of the desired angle of rotation in the plane of the map data. In some embodiments, displacing the user touch point upwards rotates the orientation of the points of the compass by a number of degrees proportional to the vertical displacement.

Figure 10:
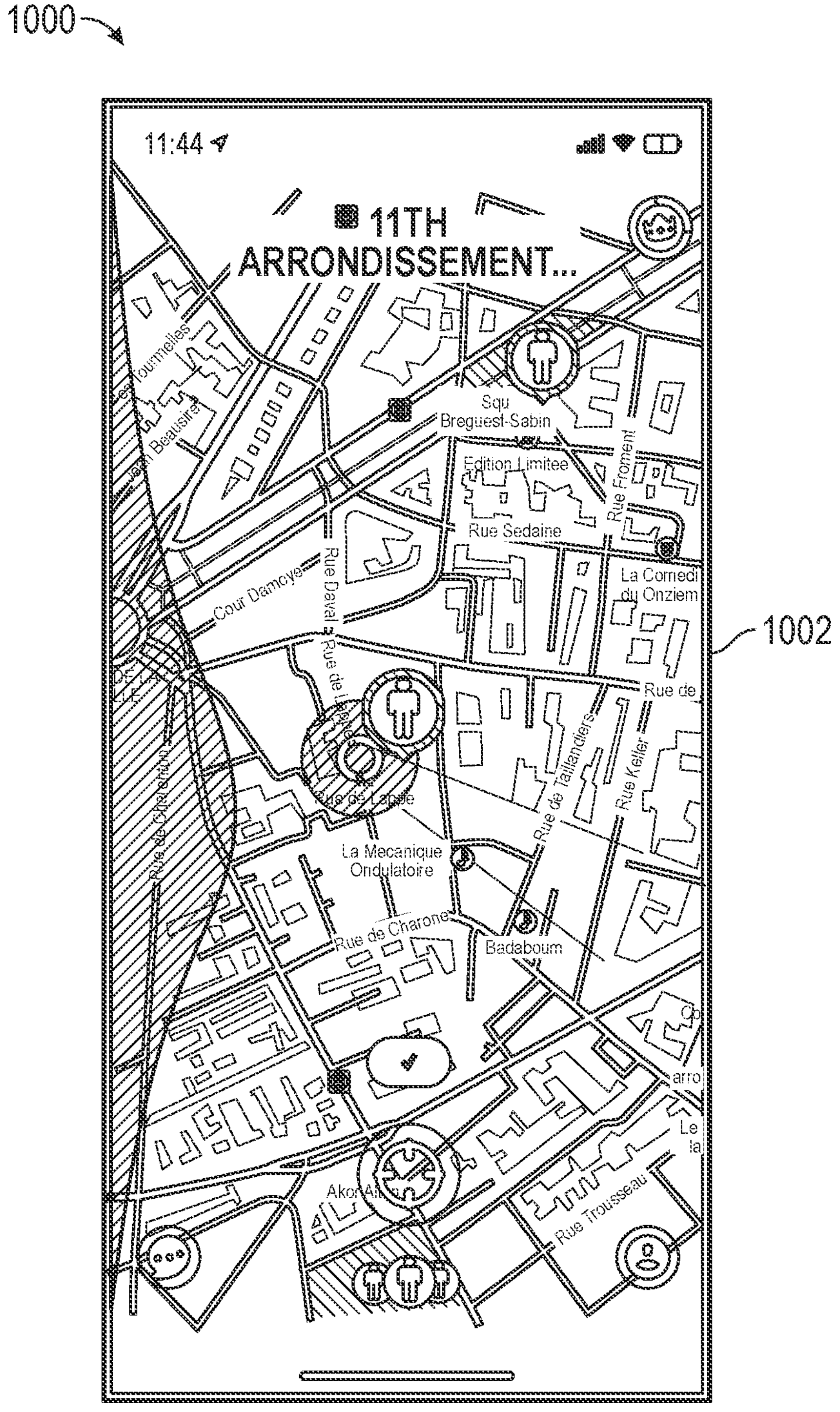
FIG. 10 illustrates a user interface in a zoom operation mode displayed on a display screen of a portable display device, in accordance with some example embodiments.
Figure 11:
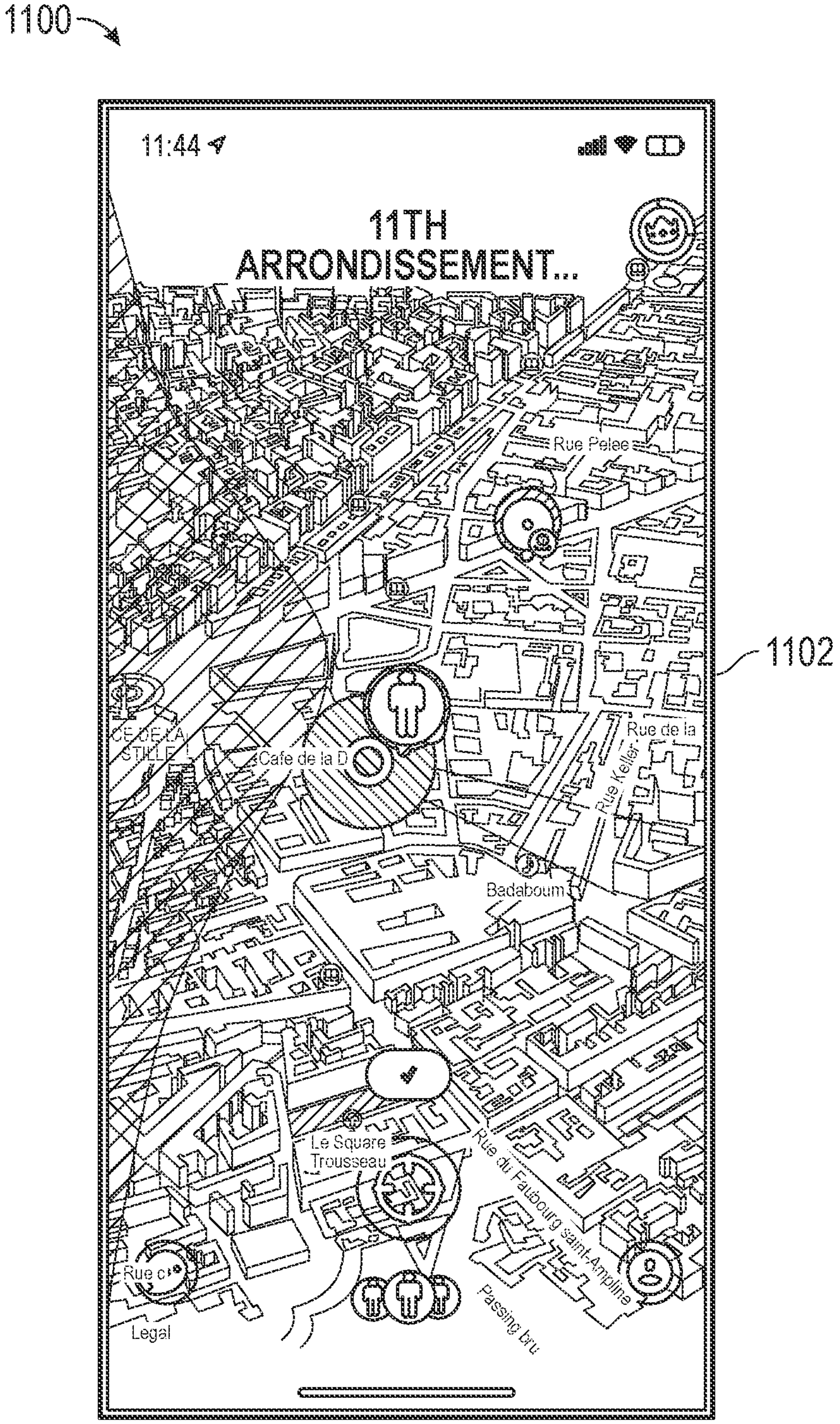
FIG. 11 illustrates a user interface in a tilt operation mode displayed on a display screen of a portable display device, in accordance with some example embodiments.
Figure 12:
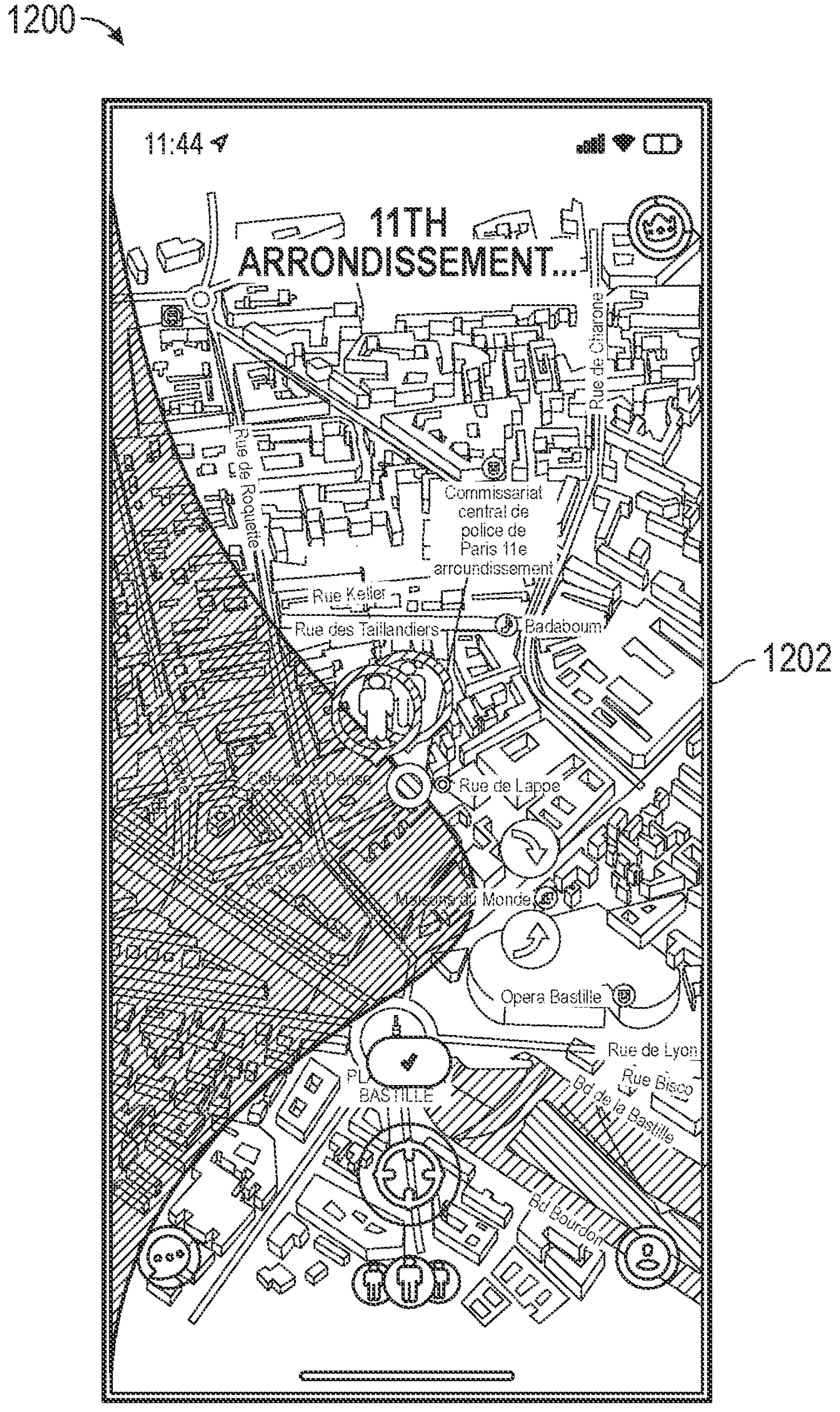
FIG. 12 illustrates a user interface in a rotate operation mode displayed on a display screen of a portable display device, in accordance with some example embodiments.

As shown in FIGS. 10 to 12, the input of a (left-handed) user is displayed as a partially transparent lobe component extending from the left-hand side of an example map GUI and overlaying map data in a first view. The furthest extent of the lobe component rightwards from the edge together with its vertical position corresponds to the current position at which the user is touching a touchscreen of a display device displaying the example map GUI. In essence, FIGS. 10 to 12 show the mirror image of the interface in FIGS. 7 to 9.

FIG. 10 illustrates a further embodiment of a map GUI in zoom operation mode. The horizontal displacement 1002 of the rightwards lobe component is seen to be within a relatively short distance from the left-hand edge, in a range from $0>X>X_1$, where $X_1$ is the boundary of the range of horizontal displacement values associated with a zoom operation mode. Vertical displacement (Y) of the point at which the user touches the touchscreen in zoom operation mode is interpreted as an indication of the desired level of zoom (i.e. map scale). In some embodiments, the vertical displacement relative to the lower edge of the screen is in linear proportion to the desired level of zoom. In some embodiments, the vertical displacement relative to the lower edge of the screen is in logarithmic proportion to the desired level of zoom.

FIG. 11 illustrates the map GUI in tilt operation mode. The horizontal displacement 1102 of the rightwards lobe component is seen to be within a distance from the left-hand edge, in a range from $X_1>X>X_2$, where $X_2$ is the upper boundary of the range of horizontal displacement values associated with a tilt operation mode. The underlying map data is seen to be viewed in a second view, presenting the map data in a three-dimensional projection having a lower viewing angle than in the first view illustrated in FIG. 10. Vertical displacement (Y) of the point at which the user touches the touchscreen in tilt operation mode is interpreted as an indication of the desired viewing angle (i.e. angle of tilt relative to a normal viewing angle from directly above).

FIG. 12 illustrates the map GUI in rotate operation mode. The horizontal displacement 1202 of the rightwards lobe component is seen to be within a distance from the left-hand edge, in a range from $X_2>X>X_3$, where $X_3$ is the upper boundary of the range of horizontal displacement values associated with a rotate operation mode. For the sake of illustration, the underlying map data is overlaid by an indicator of rotation. Vertical displacement (Y) of the point at which the user touches the touchscreen in zoom operation mode is interpreted as an indication of the desired angle of rotation in the plane of the map data. In some embodiments, displacing the user touch point upwards rotates the orientation of the points of the compass by a number of degrees proportional to the vertical displacement.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

What is claimed is:

1. A method comprising:

causing display of a geographically-based graphical user interface on a display screen, the geographically-based graphical user interface including map data displayed in a first view;

receiving input comprising at least one input point;

determining at least a first characteristic and a second characteristic of the input, wherein the first characteristic is at least one of:

a count of a number of tap gestures in a predetermined period of time, a duration of a single press touch, a measure of pressure applied in a press touch, a measure of vertical speed of a displacement from an initial input point to a subsequent input point in the input, or a measure of horizontal speed of a displacement from an initial input point to a subsequent input point in the input;

when the first characteristic of the input fulfils a first operational mode criterion, causing display, on the display screen, of the map data in a second view according to a first operational mode, the second view being based on the second characteristic of the input, the first operational mode criterion being fulfilled when the first characteristic takes a value in a first range of values; and when the first characteristic of the input fulfils a second operational mode criterion, causing display, on the display screen, of the map data in a third view according to a second operational mode, the second operational mode criterion being fulfilled when the first characteristic takes a value in a second range of values, wherein the first operational mode and the second operational mode are each distinct operational modes selected from a group of operational modes consisting of: a tilt mode, a rotate mode, a drag mode, and a zoom mode.

2. The method of claim 1, wherein the at least one input point comprises a time-separated sequence of input points provided in single handed operation of a portable display device.

3. The method of claim 2, wherein:

the first characteristic is at least one of:

the duration of the single press touch; or the measure of pressure applied in the press touch; and the value in the first range of values is a value at an initial input point of the time-separated sequence of input points, regardless of the value of the first characteristic at subsequent input points of the time-separated sequence of input points.

4. The method of claim 2, wherein the value in the first range of values is a value at an initial input point of the time-separated sequence of input points and the value of the first characteristic at subsequent input points of the time-separated sequence of input points remains within a tolerance range encompassing and wider than the first range of values.

5. The method of claim 1, wherein the geographically-based graphical user interface further includes user location data for at least one user, the user location data being displayed in at least one of the first view, second view or third view by depicting an avatar associated with the at least one user.

6. The method of claim 2, wherein the second characteristic is a vertical displacement relative to an initial input point of the time-separated sequence of input points.

7. The method of claim 2, wherein the second characteristic is a vertical speed of a displacement from an initial input point of the time-separated sequence of input points to a subsequent input point of the time-separated sequence of input points.

8. The method of claim 2, wherein the second characteristic is one of:

a vertical speed of a displacement from an initial input point of the time-separated sequence of input points to a subsequent input point of the time-separated sequence of input points; or a vertical displacement relative to an initial input point of the time-separated sequence of input points.

9. The method of claim 8, further comprising processing the input according to the tilt mode by changing an angle of tilt of a projection of the map data displayed on the display screen from a default tilt angle to an input tilt angle proportional to the second characteristic of the input.

10. The method of claim 8, further comprising processing the input according to the rotate mode by changing an orientation of the map data displayed on the display screen from a default orientation angle to an input rotation angle proportional to the second characteristic of the input.

11. The method of claim 8, further comprising processing the input according to the drag mode by moving a center coordinate of the display screen relative to a default coordinate in the map data from the default coordinate to an input coordinate along a predetermined path, a magnitude of movement being proportional to the second characteristic of the input.

12. The method of claim 8, further comprising processing the input according to the zoom mode by changing an orientation of the map data displayed on the display screen from a default scale to an input scale proportional to the second characteristic of the input.

13. A system, comprising:

at least one processor being configured to perform operations comprising:

causing display of a geographically-based graphical user interface on a display screen, the geographically-based graphical user interface including map data displayed in a first view;

receiving input comprising at least one input point;

determining at least a first characteristic and a second characteristic of the input, wherein the first characteristic is at least one of:

a count of a number of tap gestures in a predetermined period of time, a duration of a single press touch, a measure of pressure applied in a press touch, a measure of vertical speed of a displacement from an initial input point to a subsequent input point in the input, or a measure of horizontal speed of a displacement from an initial input point to a subsequent input point in the input;

based on determining that the first characteristic of the input comprises a value in a first range of values, causing display, on the display screen, of the map data in a second view according to a first operational mode, the second view based on the second characteristic of the input; and based on determining that the first characteristic of the input comprises a value in a second range of values, causing display, on the display screen, of the map data in a third view according to a second operational mode;

wherein the first operational mode and the second operational mode are each distinct operational modes selected from a group of operational modes consisting of: a tilt mode, a rotate mode, a drag mode, and a zoom mode.

14. The system of claim 13, wherein the at least one input point comprises a time-separated sequence of input points provided in single handed operation of a portable display device.

15. The system of claim 14, wherein the value in the first range of values is a value at an initial input point of the time-separated sequence of input points, regardless of the value of the first characteristic at subsequent input points of the time-separated sequence of input points.

16. The system of claim 14, wherein the value in the first range of values is a value at an initial input point of the time-separated sequence of input points and the value of the first characteristic at subsequent input points of the time-separated sequence of input points remains within a tolerance range encompassing and wider than the first range of values.

17. The system of claim 14, wherein the second characteristic is a vertical displacement relative to an initial input point of the time-separated sequence of input points.

18. The system of claim 14, wherein the second characteristic is a vertical speed of a displacement from an initial input point of the time-separated sequence of input points to a subsequent input point of the time-separated sequence of input points.

19. The system of claim 13, wherein the geographically-based graphical user interface further includes user location data for at least one user, the user location data being displayed in at least one of the first view, second view or third view by depicting an avatar associated with the at least one user.

20. A non-transitory computer-readable storage medium, the non-transitory computer-readable storage medium including instructions that when executed by a computer, cause the computer to perform operations comprising:

causing display of a geographically-based graphical user interface on a display screen, the geographically-based graphical user interface including map data displayed in a first view;

receiving input comprising at least one input point;

determining at least a first characteristic and a second characteristic of the input, wherein the first characteristic is at least one of:

a count of a number of tap gestures in a predetermined period of time, a duration of a single press touch, a measure of pressure applied in a press touch, a measure of vertical speed of a displacement from an initial input point to a subsequent input point in the input, or a measure of horizontal speed of a displacement from an initial input point to a subsequent input point in the input;

based on determining that the first characteristic of the input comprises a value in a first range of values, causing display, on the display screen, of the map data in a second view according to a first operational mode, the second view based on the second characteristic of the input; and based on determining that the first characteristic of the input comprises a value in a second range of values, causing display, on the display screen, of the map data in a third view according to a second operational mode;

wherein the first operational mode and the second operational modes are each distinct operational modes selected from a group of operational modes consisting of: a tilt mode, a rotate mode, a drag mode, and a zoom mode.

* * * * *